United States Patent [19]

Baumgartner et al.

[11] Patent Number: 5,195,086
[45] Date of Patent: Mar. 16, 1993

[54] MULTIPLE CALL CONTROL METHOD IN A MULTIMEDIA CONFERENCING SYSTEM

[75] Inventors: Thomas J. Baumgartner, St. Charles; Yeou H. Hwang, Naperville; Edith H. Jones, Lisle; Wu-Hon F. Leung, Downers Grove; Lara F. Morgan, Warrenville; Shi-Chuan Tu, Lisle, all of Ill.

[73] Assignee: AT&T Bell Laboratories, Murray Hill, N.J.

[21] Appl. No.: 509,010

[22] Filed: Apr. 12, 1990

[51] Int. Cl.$^5$ .............................................. H04M 3/56
[52] U.S. Cl. ....................................... 370/62; 379/202
[58] Field of Search .................. 370/62; 379/158, 202, 379/203, 204, 205

[56] References Cited

U.S. PATENT DOCUMENTS

| 4,905,231 | 2/1990 | Leung et al. | 370/94.1 |
| 4,937,856 | 6/1990 | Natarajan | 370/62 |
| 4,991,171 | 2/1991 | Teraslinna et al. | 370/94.1 |

OTHER PUBLICATIONS

E. Brian Carne "Modern Telecommunication" pp. 44–47 1984.
J. J. Degan et al., "Fast Packet Technology for Future Switches", AT&T Technical Journal, vol. 68, No. 2, Mar./Apr. 1989, pp. 36–50.
S. Nojima et al., "High Speed Packet Switching Network for Multi-Media Information", *Proceedings of IEEE 1986 Computer Networking Symposium*, pp. 141–150.
K. Yukimatsu et al., "Multicast Communication Facilities in a High Speed Packet Switching Network", *Proceedings of ICCC'86*, pp. 276–281.
E. Arthurs et al., "The Architecture of a Multicast Broadband Packet Switch", *Proceedings of IEEE INFOCOM'88*, pp. 1–8.
K. Y. Eng et al., "Multicast and Broadcast Services in a Knockout Packet Switch", *Proceedings of IEEE INFOCOM'88, pp. 29–34*.
J. S. Turner, "Design of a Broadcast Packet Switching Network", *IEEE Trans. on Communications*, vol. 36, No. 6, 1988, pp. 734–743.
W. H. Leung et al., "A Set of Operating System Mechanisms to Support Multi-Media Applications", *Proceedings of 1988 International Zurich Seminar on Digital Communications*, Mar. 1988, pp. B4.1–B4.6.
A. Glafoor et al., "An Efficient Communication Structure for Distributed Commit Protocols", *IEEE Journal on Selected Areas in Communications*, vol. 7, No. 3, Apr. 1989, pp. 375–389.
S. E. Minzer et al., "New Directions in Signaling for Broadband ISDN", *IEEE Communications Magazine*, Feb. 1989, pp. 6–14.
L. Aguilar et al., "Architecture for a Multimedia Teleconferencing System", *Proceedings ACM SIGCOMM'86 Symposium, Aug., 1986, pp. 126–136*.
S. R. Ahuja et al., "The Rapport Multimedia Conferencing System", *Proceedings of Conference on Office Information Systems*, Mar. 1988, pp. 1–8.
H. Forsdick, "Explorations into Real-Time Multimedia Conferencing", *Proceedings of the 2nd International Symposium on Computer Message Systems*, IFIP, Sep., 1985, pp. 331–347.
K. A. Lantz, "An Experiment in Integrated Multimedia Conferencing", *Proceedings of the Conference on Computer-Supported Cooperative Work'86*, Dec. 1986, pp. 533–552.
A. Poggio et al., "CCWS: A Computer-Based, Multimedia Information System", Computer, Oct. 1985, pp. 92–103.

Primary Examiner—Douglas W. Olms
Assistant Examiner—Min Jung
Attorney, Agent, or Firm—R. T. Watland; M. B. Johannesen

[57] ABSTRACT

A method for use in a multimedia conferencing arrangement to control multiple concurrent calls where each call comprises one or more channels. A first call among a first set of user stations and a second call among a second set of user stations are merged into a single call comprising a plurality of channels among at least three user stations from the first and second sets. The plurality of channels of the single, merged call corresponds to a combination of channels of the first and second calls and may include a signalling channel, a voice channel, and one data channel for each data channel of the first and second calls. The method is also applicable to calls including image or video channels.

34 Claims, 15 Drawing Sheets

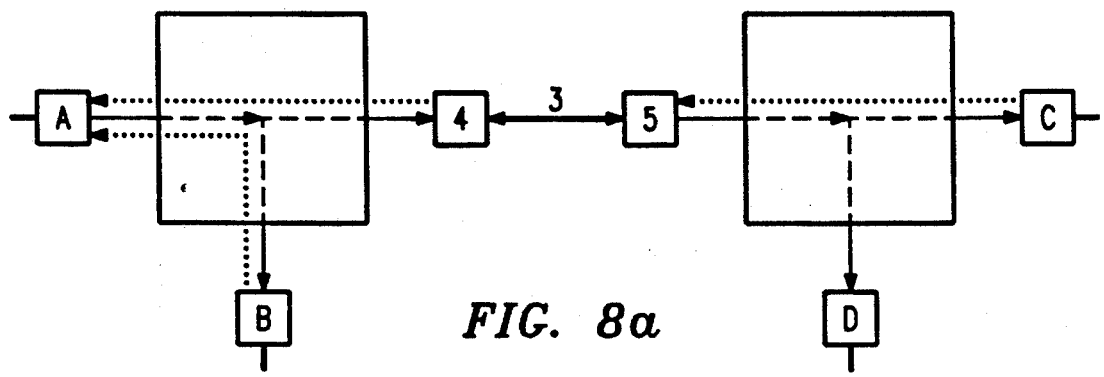
FIG. 8a
FIG. 8b
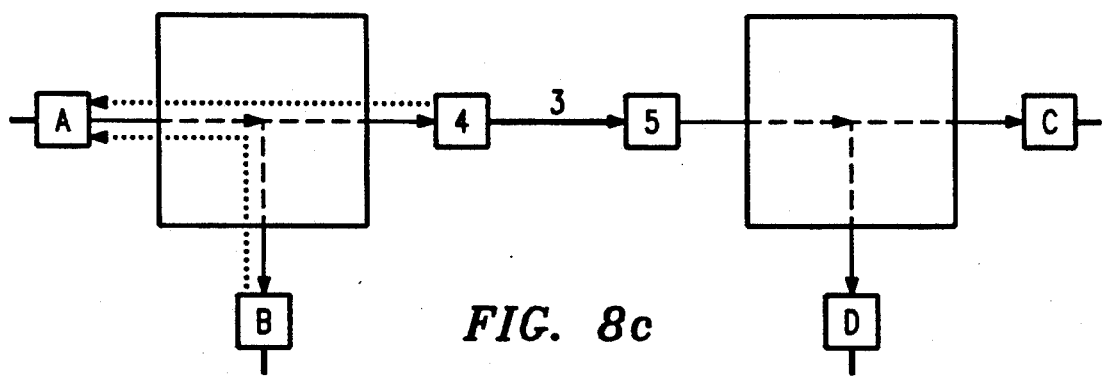
FIG. 8c
FIG. 8d

|     | $e_3$ | $e_4$ |
|-----|-------|-------|
| $e_1$ | 1 | 1 |
| $e_2$ | 1 | 0 |
FIG. 9a
|     | $e_3$ | $e_4$ |
|-----|-------|-------|
| $e_1$ | 1 | 0 |
| $e_2$ | 0 | 1 |
FIG. 9b
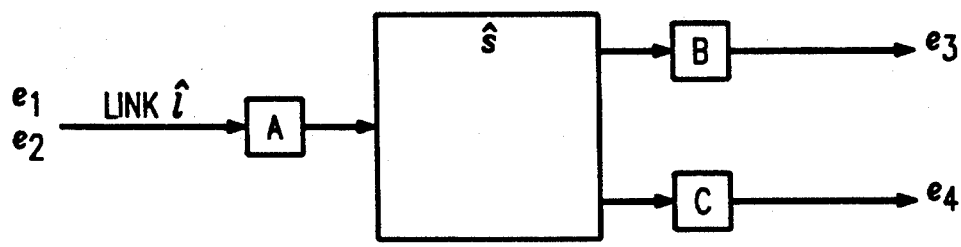
FIG. 9c
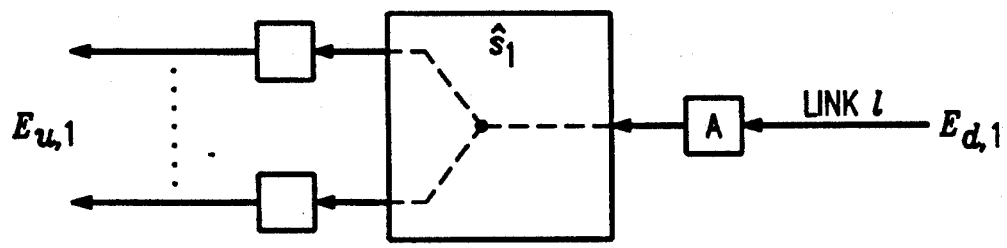
FIG. 10a
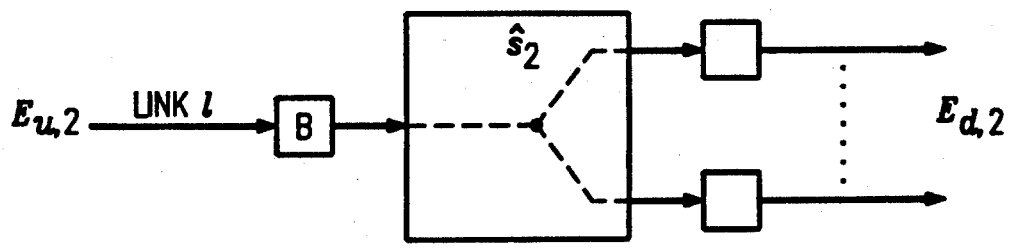
FIG. 10b

CONFERENCE SYSTEM 1000

CONFIGURATION OF
CHARACTER-BASED APPLICATION

CONFIGURATION OF
X WINDOW-BASED APPLICATION

UI MAIN MENU

CONFERENCE ROOM

DIRECTORY

CONFERENCE ROOM
AND ITS APPLICATIONS

PHONE ACCESS CONTROL WINDOW

KSH ACCESS CONTROL WINDOW

RECORD-PLAY MENU WINDOW

ORIGINAL ROOM

NEW ROOM

ORIGINAL ROOM

NEW ROOM

MULTIPLE CALL CONTROL METHOD IN A MULTIMEDIA CONFERENCING SYSTEM

CROSS-REFERENCE TO RELATED APPLICATIONS

This application is related to the application of T. J. Baumgartner and W. F. Leung U.S. Pat. No. 5,138,614 entitled "Transformation Method for Network Conference Connections", and W. F. Leung and S. Tu U.S. Pat. No. 5,103,444 entitled "Conference Connection Method in a Multicast Packet Switching Network" filed concurrently herewith and assigned to the same assignee as the present application.

TECHNICAL FIELD

This invention relates to communication conferencing.

BACKGROUND AND PROBLEM

U.S. Pat. No. 4,905,231, issued to W. F. Leung et al. on Feb. 27, 1990, discloses a multimedia communication system using a single packet switching network for the various media based on what is referred to as a multimedia virtual circuit. A virtual circuit is a packet-switched communication path between two endpoints. A network call setup procedure establishes a virtual circuit and an associated virtual circuit identifier based on a destination address. To route successive packets, the network needs only the virtual circuit identifier. In a multimedia virtual circuit, a virtual circuit is divided into multiple virtual channels at the workstations. Each channel represents a different information medium and has a separate channel identifier; the composite multimedia virtual circuit represents the resulting multimedia call. As the various multimedia call sources generate traffic, the workstation multiplexes the packetized traffic onto a single network virtual circuit. The destination workstation demultiplexes this traffic back into multiple channels, which it routes to a telephone, speaker, file, or other destination. This process preserves the temporal ordering of the information streams so that in a voice and video call, for example, the voice corresponds to the mouth movement in the video picture. The multimedia virtual circuit also provides a simple way to let a multimedia call destinatio associate the multiple media. A single incoming call notification arrives from the network to announce a call. The workstations then exchange signaling information over a virtual channel of the multimedia virtual circuit to set up all the necessary channels and to route them to the appropriate devices.

The Rapport multimedia conferencing system, disclosed in the S. R. Ahuja et al. article, "The Rapport Multimedia Conferencing System," *Proceedings of Conference on Office Information Systems*, March 1988, supports interactive, real-time distributed conferences among two or more people. Executing on personal workstations interconnected by separate data and voice networks, the Rapport system provides basic mechanisms to create, manage, and terminate conferences. The system provides an environment in which many types of meetings can take place, including telephone conversations, discussion among colleagues, and lectures. Existing workstation programs can be used during a conference to produce and edit data and displays for the conferees. Rapport is designed to help people emulate face-to-face conferences as closely as possible with their workstations. However, the reliance on separate networks for the different media (data and voice) substantially complicates the control of conference calls. Although concurrent participation in many conferences is possible, a user is only able to communicate on one call at a time. A Rapport system user may participate in many conferences concurrently by switching among contexts at the click of a mouse button. This is equivalent to being able to walk in and out of several meeting rooms (and one's office) instantly. It is anticipated that this capability will encourage users to keep many conferences active for long periods of time in much the same fashion as the use of screen windows allows one to keep many programs and files active with the present data networks. One such long-lived conference might be an intercom connection between a manager and a secretary. Others might be among the collaborators in a design project or the authors of a paper. It is anticipated that once the capability for multiple concurrent calls is provided, it will be useful to merge and split such calls. For example, the manager may ask the secretary to join a design project conference from time to time to assist the project team. The effective control of a plurality of multimedia calls poses a technical problem, particularly in the Rapport system arrangement comprising several separate networks, but also for the system of the above-referenced U.S. Pat. No. 4,905,231 employing a single network for all media.

SOLUTION

This problem is solved and a technical advance is achieved in accordance with the principles of the invention in a method for controlling multiple concurrent calls where each call comprises one or more channels. A first call among a first set of user stations and a second call among a second set of user stations are, for example, merged into a single call comprising a plurality of channels among, significantly, at least three user stations from the first and second sets. The plurality of channels of the single, merged call corresponds to a combination of channels of the first and second calls and, illustratively, may include a signalling channel, a voice channel, and one data channel for each data channel of the first and second calls (FIG. 1). The method is also applicable to calls including image or video channels.

In an illustrative embodiment, a user interface is provided such that the first call is established in response to user input, e.g., input via a mouse button, and, in addition, representations, e.g., face icons corresponding to users of the first set of user stations, are displayed in a window of a display (FIG. 17). The second call is established in similar fashion among the second set of user stations. The merging of the two calls is effected in response to user input at a user station that is a member of both the first and second sets. As a result of the merge, representations corresponding to the user stations of the first and second sets are displayed in a window for the merged call. In addition, representations each corresponding to one of the plurality of channels of the merged call are also displayed in the window. Icons for a voice channel, a data channel being used for a character-based application ksh, and a data channel being used for a graphical-based application EZ, are illustrated in FIG. 19 in a representation of a conference room. The data communication applications themselves are displayed in other windows. An access control mechanism provides selective access for a user station to transmit information to and receive information from the plurality of channels of the merged call. The plurality of channels of the merged call comprise virtual channels of a multicast connection through a packet switching network. A merge request is transmitted from one user station via the network to each of the other user stations of the first and second set. The merging is initiated in response to receipt of a favorable reply from each of the other user stations.

In a method of the invention, a single call, comprising a plurality of channels, is provided among a set of user stations. The single call is split into a first call among a first subset of user stations and a second call among a second subset of user stations. The first call includes channels corresponding to a first subset of the channels of the single call and the second call includes channels corresponding to a second subset of the channels of the single call (FIG. 2).

A further method of the invention is used in an arrangement comprising a communication network interconnecting a plurality of user stations. A first call, comprising at least a voice channel, is provided among a first set of user stations, and a second call, comprising at least a voice channel, is provided among a second set of user stations. One user station is a member of both of the first and second sets. The one user station enables a user to communicate via both of the first and second calls at the same time.

Illustratively, the one user station comprises a voice bridge, implemented, for example, using a plurality of voice packet/analog voice converters, and a conventional analog voice bridge. A user is able to communicate on two (or more) calls at a time. The user is able to transmit voice concurrently on the voice channels of both of the first and second calls. The user is also able to transmit voice on the voice channel of one call and to concurrently receive voice on the voice channel of the other call. Further, the user is able to receive voice concurrently on the voice channels of both of the first and second calls.

In a further method of the invention, the network provides a first call among a first set of user stations and a second call among a second set of user stations. At least one user station, which is a member of both of the first and second sets, includes a display. Representations corresponding to the first set of user stations are displayed in a first window for the first call, and concurrently, representations corresponding to the second set of user stations are displayed in a second window for the second call. A user may record a first call while communicating on a second call.

DRAWING DESCRIPTION

FIG. 8a–FIG. 8d are diagrams used in describing properties of data packet flow patterns;

Figure 11A:
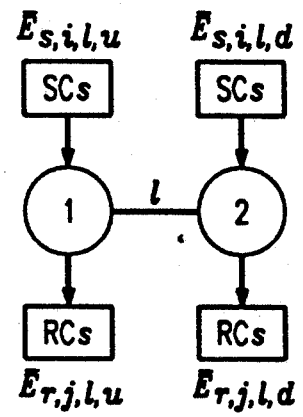
Figure 11B:
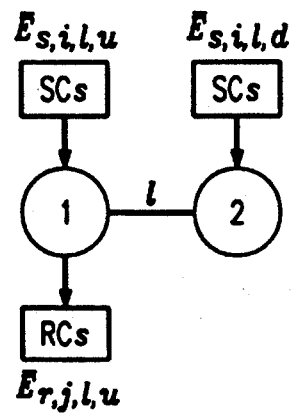
Figure 11C:
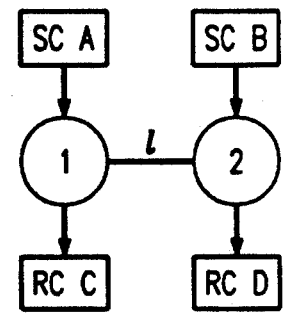
Figure 12:
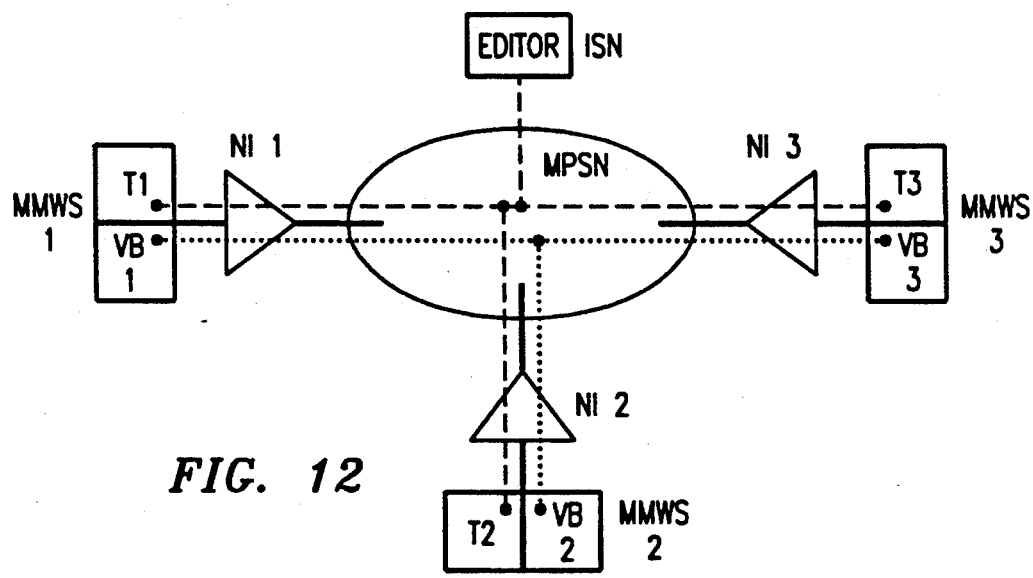
Figure 13:
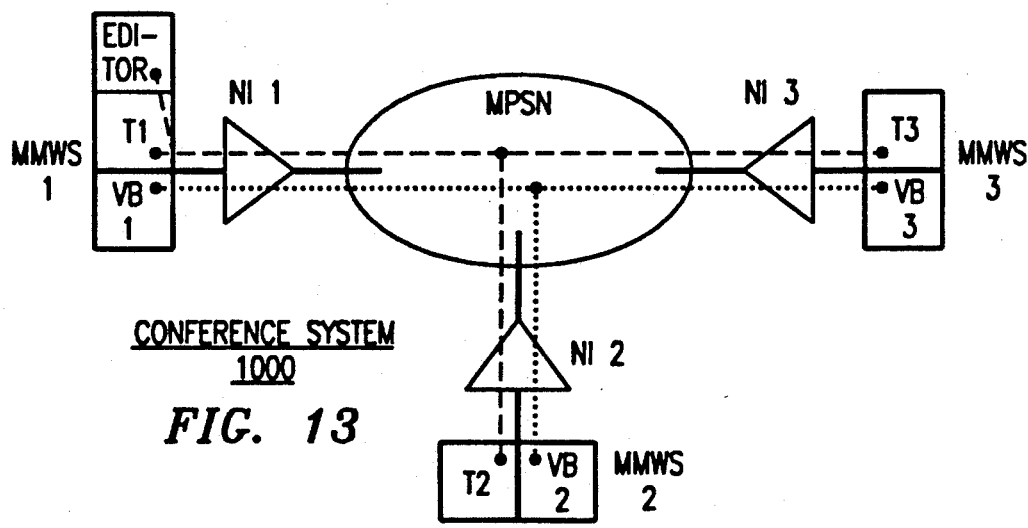
Figure 14:
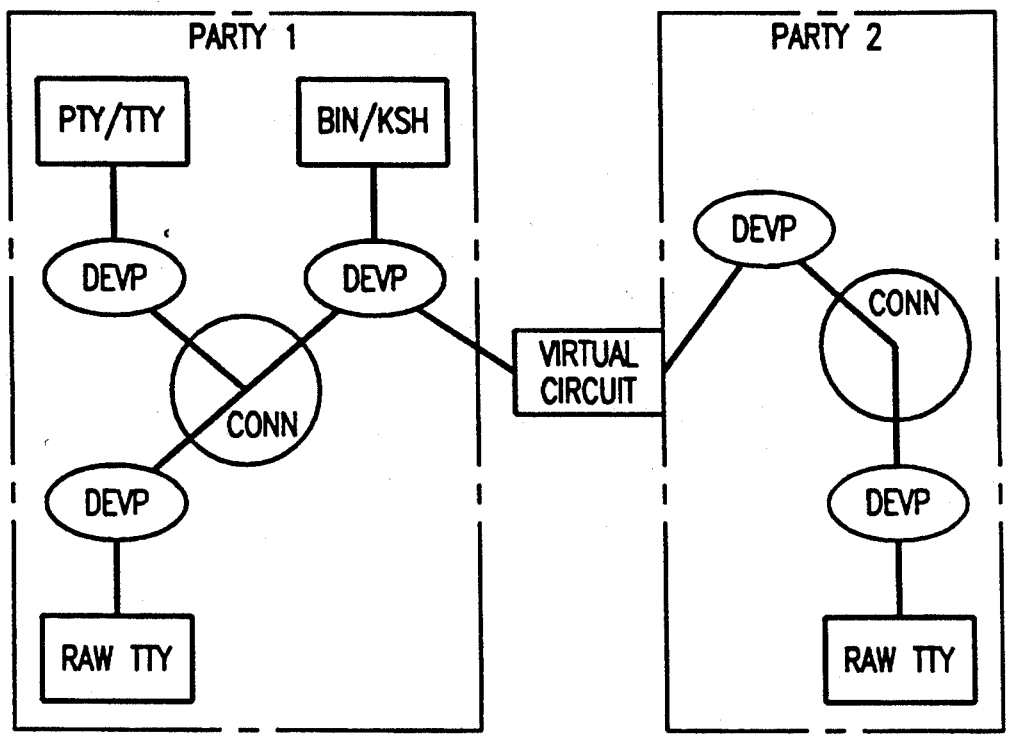
Figure 15:
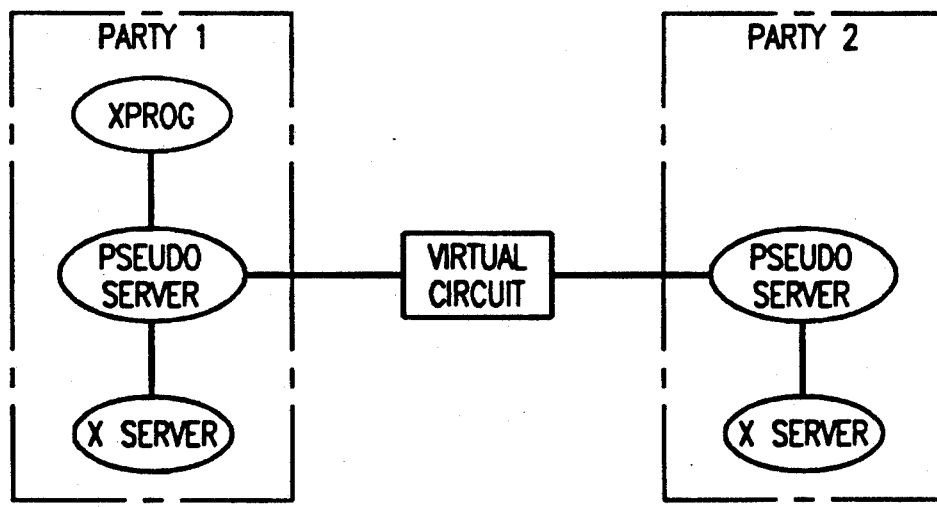
Figure 16:
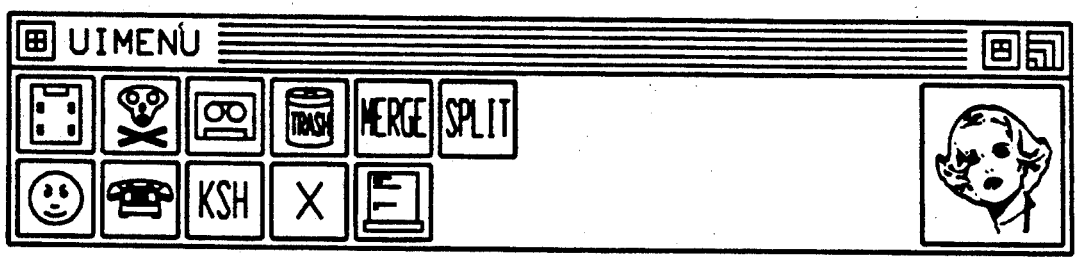
Figure 23A:
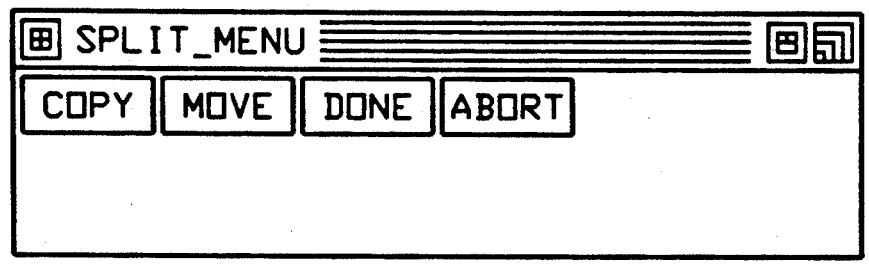
Figure 23B:
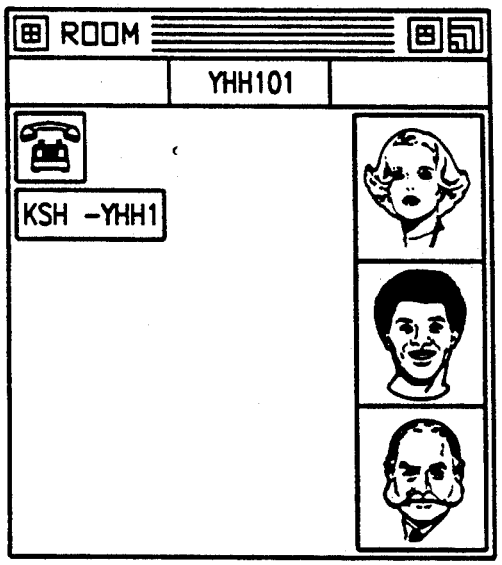
Figure 23C:
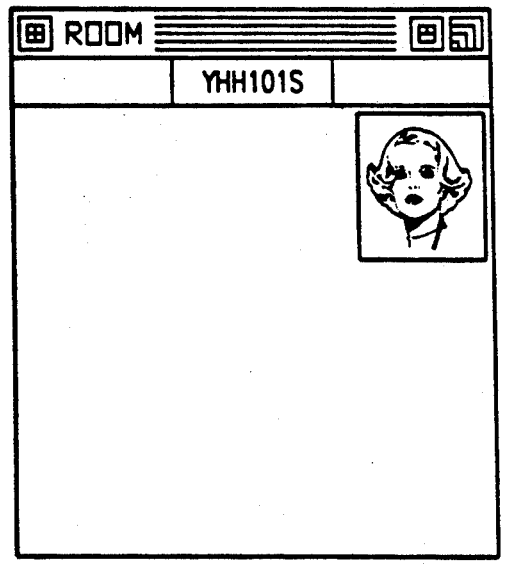
Figure 24A:
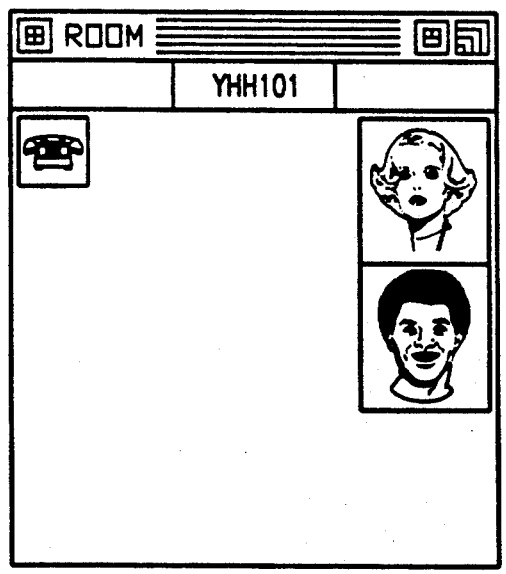
Figure 24B:
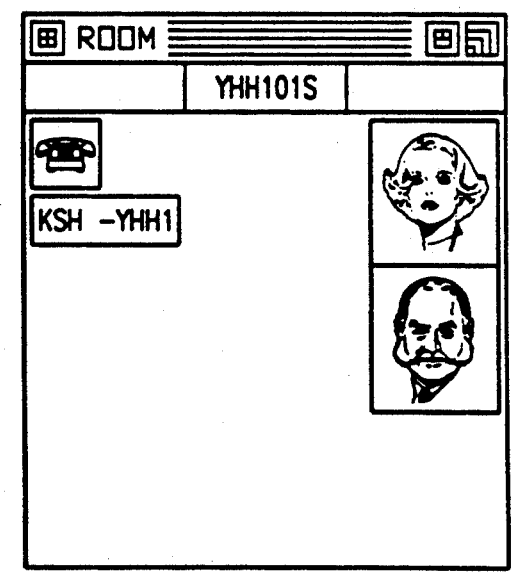
Figure 25:
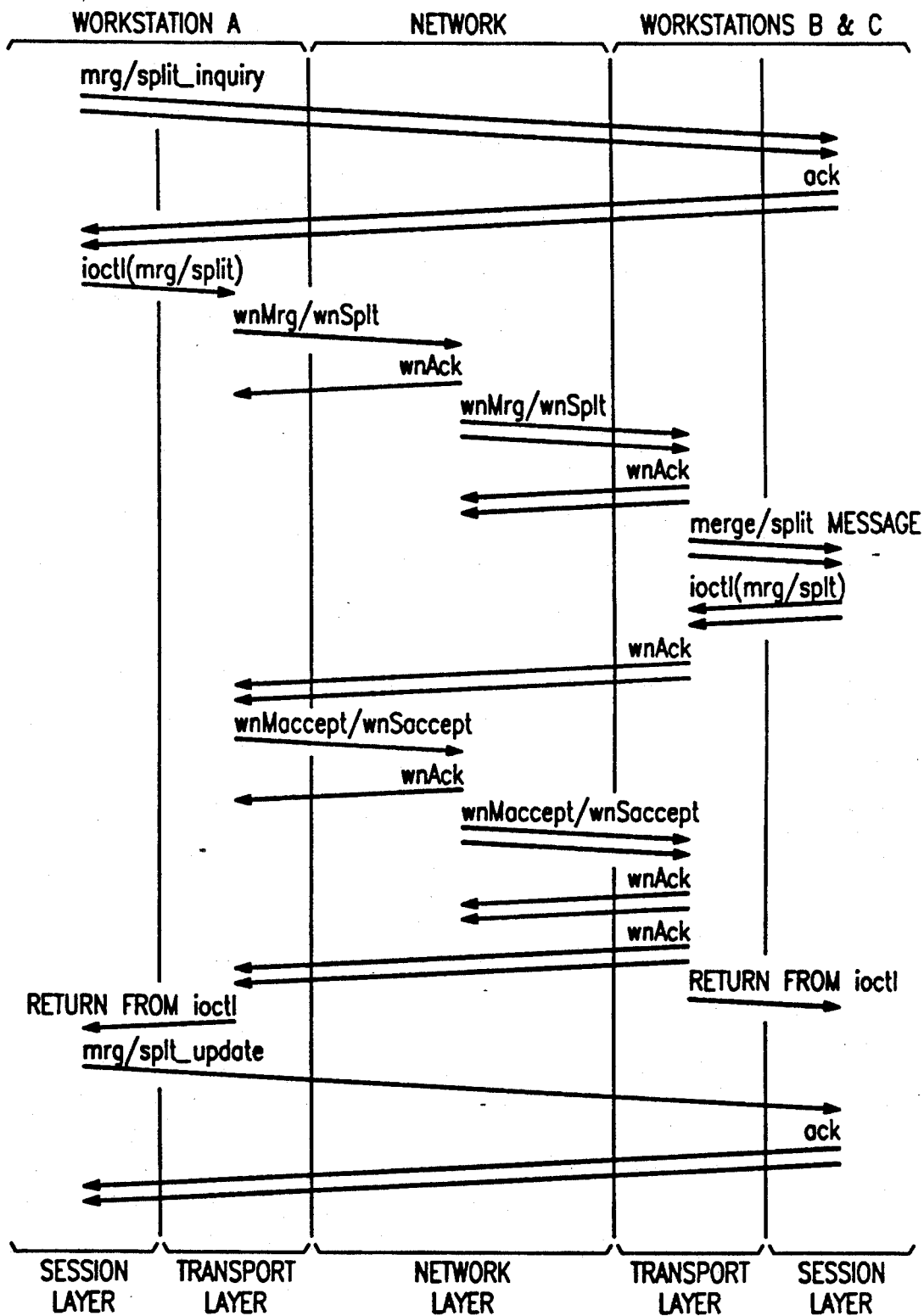

FIG. 9a–FIG. 9c and FIG. 10a–FIG. 10b diagrams used in describing properties of vanilla multicast connections;

FIG. 11a–FIG. 11c are diagrams used in describing properties of strong multicast connections;

FIG. 12 and FIG. 13 are diagrams of two multimedia conferencing arrangements (the FIG. 13 arrangement is a particular exemplary embodiment, referred to herein as conference system 1000, which implements illustrative multiple call control methods of the invention);

FIG. 14 illustrates the use of the connector and the virtual circuit in sharing a character-based application program;

FIG. 15 illustrates the sharing of a graphical program by two parties;

FIG. 16–FIG. 24 illustrate various menus, window and icons for effecting conference calls and merging and splitting operations in accordance with a user interface for the conferencing arrangement of FIG. 13; and FIG. 25 illustrates a two-phase protocol used for merging and splitting multi-channel calls in the conferencing arrangement of FIG. 13.

DETAILED DESCRIPTION

Multicast Connections

Figure 3:
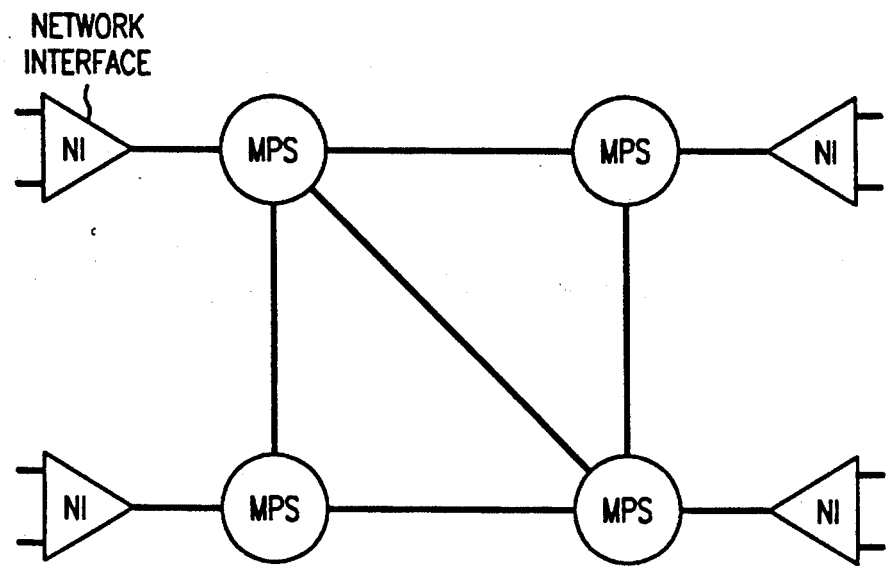
FIG. 3 is a diagram of a multicast packet switching network.

FIG. 3 shows a multicast packet switching network which consists of multicast packet switches (MPSs) and network interfaces (NIs).

To achieve high-speed transmission, the multicast packet switching network is based on fast packet technology (described in J .J. Degan et al., "Fast Packet Technology for Future Switches", *AT&T Technical Journal*, Vol. 68, No. 2, p. 36–50, 1989), having the following attributes:(a) Link-by-link error and flow control is eliminated. Thus, the required field in the data link header is for the logical channel number (LCN), which is used for routing packets through the multicast packet switching network. An LCN for each link within a connection is decided at connection setup time; (b) Edge-to-edge error control can be incorporated within the multicast packet switching network on a per-connection basis; and (c) The multicast packet switching network provides internal connection-oriented services that support high-bandwidth applications very efficiently. In such networks, the required link bandwidth and the end-to-end delay for a multicast application are independent of the number of users. Also, the network performance will not degrade as the number of users increases. These advantages provide a solid foundation for the multicast packet switching network as a vehicle for supporting various multicast applications, especially, interactive multimedia multi-party conferencing.

Figure 4:
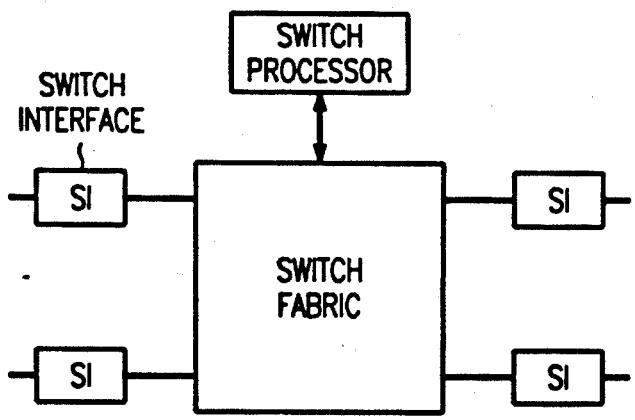
FIG. 4 is a diagram of an individual multicast packet switch in the network of FIG. 3.

A multicast packet switch is composed of a switch fabric, a switch processor, and switch interfaces (SIs), as shown in FIG. 4. The switch fabric is capable of duplicating an incoming packet and routing the copies to desired outgoing ports. An exemplary multicast packet switch is disclosed in the U.S. patent application of K. T. Teraslinna et al., Ser. No. 07/412,952, assigned to the assignee of the present invention.

Figure 5:
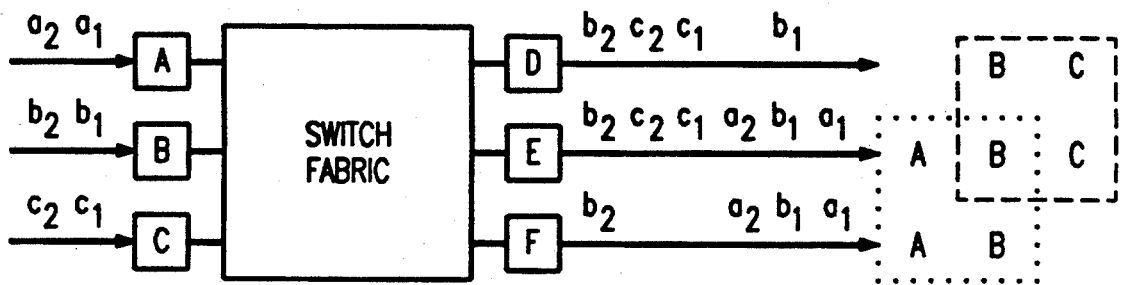
FIG. 5 is a diagram illustrating a strong packet sequencing condition.

[Definition 2.1]: With multiple input streams each destined to multiple outputs, a switch fabric is said to have a. the weak sequencing (WS) property, if it only guarantees point-to-point sequential transfer from each input port to any of its output ports; or
b. the strong sequencing (SS) property, if those output ports receiving two or more common inputs have identical interleaved packet streams with respect to the packet streams from the common input ports. For example, in FIG. 5, the two subsequences of outgoing packet streams at switch interfaces D and E (or switch interfaces E and F) containing $\{b_i\}$ and $\{c_i\}$ (or $\{a_i\}$ and $\{b_i\}$) are identical.

A multicast packet switch will be represented as w-MPS (or s-MPS) if its switch fabric has the weak sequencing (or strong sequencing) property.

In general, different links within a multicast connection may use different LCNs. Thus, each switch interface maintains a packet translation table (PTT) and a multicast control table (MCT) to store routing information about those multicast connections. Each entry of a packet translation table, indexed by an incoming LCN, contains a multicast connection number (MCN) and a switch header. On the incoming link, the MCN field stores the MCN assigned to a multicast connection during connection setup. The switch header identifies a set of outgoing links involved in a multicast connection, which is used for packet duplication and routing through a switch fabric. Each entry of the multicast control table, indexed by a MCN, contains the LCN chosen for the outgoing link within a multicast connection.

Figure 6:
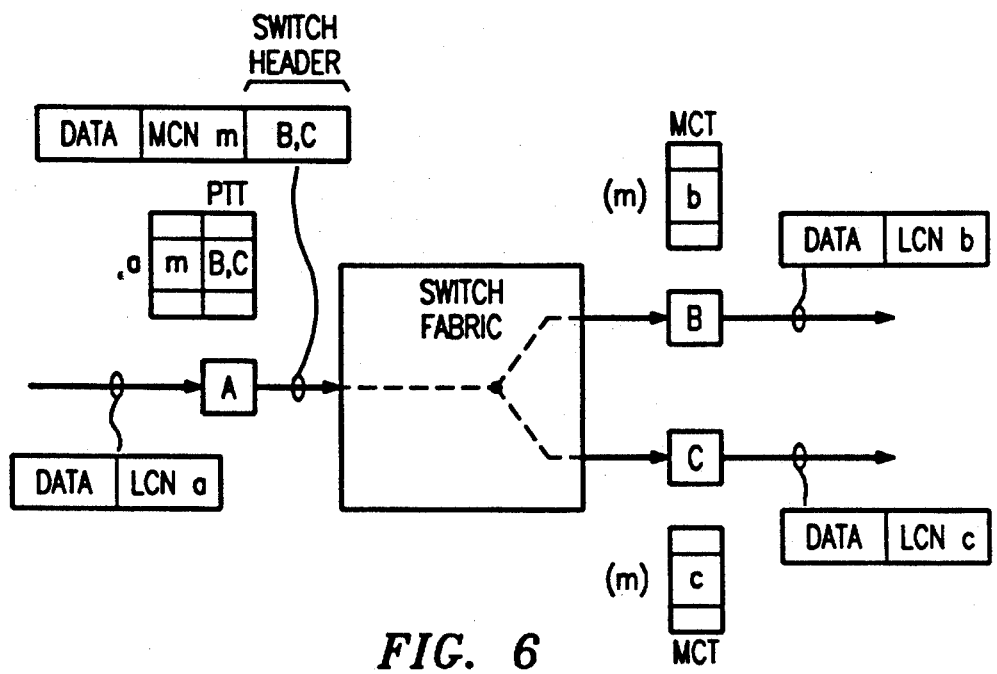
FIG. 6 is a diagram illustrating the packet switching process for a multicast connection through a multicast packet switch.

FIG. 6 illustrates the data packet switching process through a multicast packet switch for a multicast connection. An incoming packet accesses the packet translation table by LCN a at switch interface A. Switch interface A then replaces LCN a in the packet header by the stored MCN m and prepends the stored switch header to the packet for packet duplication and routing. Each outgoing packet uses MCN m in its header to access the multicast control table at the outgoing switch interface and obtains an outgoing LCN. Switch interface B and switch interface C then replace MCN m in the packet header by LCN b and LCN c, respectively. Finally, the switch header of each outgoing packet will be stripped off at the outgoing switch interface before it leaves.

[Lemma 1]: Any arbitrary data packet flow pattern (DPFP) within a multicast packet switch can be achieved.

<Proof>: Given a set of switch interfaces, with an LCN chosen for each switch interface, it is clear that the direction of data packet flow among these switch interfaces can be controlled by writing suitable information into their packet translation tables and multicast control tables.

Figure 7A:
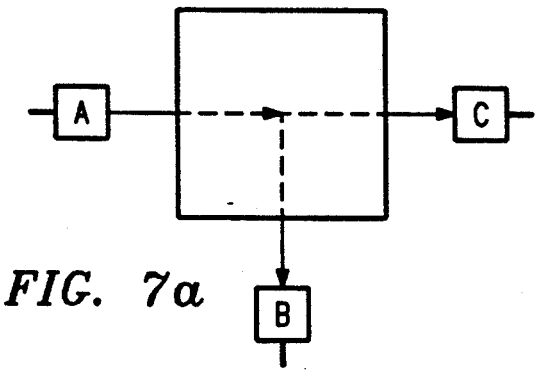
FIG. 7a–FIG. 7c illustrate three data packet flow patterns within a multicast packet switch.
Figure 7B:
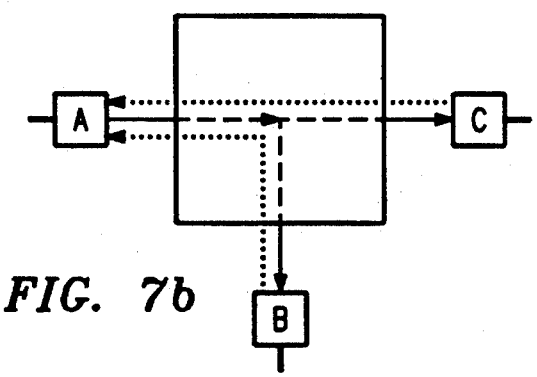
Figure 7C:
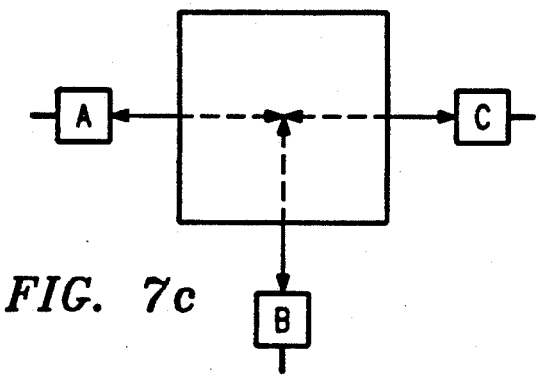

FIG. 7 illustrates three natural data packet flow patterns within a multicast packet switch: (a) point-to-multipoint, (b) point-to-mulitpoint with upstream capability, and (c) multipoint-to-multipoint. They will be referred to as pattern-1, pattern-2 and pattern-3 data packet flow patterns, respectively.

The switch processor (FIG. 4) establishes and disconnects switched multicast connections across the multicast packet switching network.

A network interface (FIG. 3) provides an access point to the multicast packet switching network for various networks and equipments, e.g., user stations, connected to it. It is responsible for protocol/speed conversion, packet assembly/disassembly, signaling, etc. It also provides an edge-to-edge flow/error control across the multicast packet switching network on a per-connection basis.

A source-based multicast routing method is used to perform multicast connection setup. This method can be applied to both switched multicast connection setup and multicast connectionless packet routing.

For each multicast packet switch in the multicast packet switching network, several spanning trees rooted at this multicast packet switch are generated. A unique global tree number (TN) will be assigned for each tree. Based on these trees, multicast routing tables (MRTs) are established at each multicast packet switch during network initialization. The size of the multicast routing tables depends on the number of multicast packet switches in the multicast packet switching network and the number of trees. Therefore, a tradeoff between the number of trees and memory space required at each multicast packet switch is made. These tables may be updated dynamically. However, it should be done infrequently. The advantage of using multiple spanning trees is to provide alternate multicast routes such that the connection completion rate can be improved. Under normal situations, the connection control packets for establishing or disconnecting a connection progress forward from the source multicast packet switch to the next destination multicast packet switches. They may need to crankback to the source multicast packet switch for finding alternate spanning trees when some multicast packet switch belonging to the chosen spanning tree rejects the new connection setup for some reason.

The basic connection setup procedure is as follows. When a connection setup packet arrives at the source multicast packet switch, the switch processor chooses a tree number, among a set of tree numbers which correspond to those spanning trees rooted at this multicast packet switch, based on a load sharing method. Based on the destination set in the packet and the multicast routing table indexed by the chosen global tree number, the switch processor checks if the appropriate necessary and sufficient conditions described in detail herein are met to determine whether the multicast connection that would be established would be usable to effect communication in accordance with a specified transmission matrix and meeting a given packet sequencing condition. If the check is positive, the switch processor then partitions the destination set into several subsets; each subset will use a different outgoing link. By putting the chosen tree number in the packet and masking off all other destination addresses in the destination set except those in the corresponding subset, a modified copy of the original connection setup packet is then generated and sent to each desired outgoing link. In addition, the switch processor will choose an available multicast connection number (MCN) and send signal packets to update the translation tables in each involved switch interface. When the modified packet reaches the next multicast packet switch, the switch processor uses the tree number in the packet to index a multicast routing table, does some necessary checking, and then further partitions the destination subset. This procedure repeats until all the destinations are reached.

The concept of multicast connections is a natural extension of that of point-to-point connections. That is, a multicast connection is a logical association among a set of network interfaces over which all packets following the same route, need not carry complete destination addresses and arrive in sequence. Based on different requirements, four flavors of multicast connections are defined over an arbitrary multicast packet switching network: vanilla multicast connections (VMCs), multicast virtual circuits (MVCs), strong multicast connections (SMCs) and strong multicast virtual circuits (SMVCs). Roughly speaking, vanilla multicast connections and strong multicast connections only provide network-layer connection-oriented services to the users, and packet loss is allowed. They depend on the users' transport layer to execute error control, if necessary. On the other hand, multicast virtual circuits and strong multicast virtual circuits provide network-layer virtual circuit services to the users, which ensure reliable packet transfer. Therefore, error control in the transport layer is not necessary.

Four flavors of multicast connections are defined on acyclic subgraphs of the graph representing a multicast packet switching network. Acyclic subgraphs guarantee that each multicast connection contains no loop and every packet will reach its destination(s) in finite time and low delay.

[Definition 3.1]:
a. An arbitrary multicast packet switching network is represented by a graph $G=\{S, E, L\}$, where S is the set of all multicast packet switches, E is the set of all network interfaces, and L is the set of all links.
b. $\overline{G}=\{\overline{S}, \overline{E}, \overline{L}\}$ represents an acyclic subgraph of G, which interconnects all network interfaces in a subset $\overline{E}$ of E via a subset $\overline{S}$ of S and a subset $\overline{L}$ of L. Any link 1 in $\overline{L}$ cuts $\overline{G}$ into two disjoint subgraphs $\overline{G}_{1,u}$ and $\overline{G}_{1,d}$. Let $\overline{E}_{1,u}$ and $\overline{E}_{1,d}$ be two disjoint subsets of $\overline{E}$, which contain those network interfaces in $\overline{G}_{1,u}$ and $\overline{G}_{1,d}$, respectively.
c. Each network interface contains a sender component (SC) and a receiver component (RC) that sends and receives packets, respectively. Let SC i and RC i represent the sender component and the receiver component of network interface i, respectively.

Consider an arbitrary acyclic subgraph $\overline{G}$ of G. According to Lemma 1, with an LCN chosen for each switch interface, any arbitrary data packet flow pattern within each multicast packet switch in $\overline{S}$ can be achieved. Interconnection of these individual data packet flow patterns via the links in $\overline{L}$ constitutes a data packet flow pattern on $\overline{G}$. The flow direction on each link is determined by two individual data packet flow patterns at its ends. With a data packet flow pattern within each multicast packet switches being exemplified, link 3 has a bidirectional flow in FIG. 8(a) and a unidirectional flow in FIG. 8(c). The corresponding transmission matrices are given in FIG. 8(b) and FIG. 8(d).

[Lemma 2]: Given a $\overline{G}$, any data packet flow pattern constructed on $\overline{G}$ has the following properties:
a. Only a single LCN is associated with each link in $\overline{L}$.
b. The data packet flow pattern satisfies the weak sequencing (WS) condition, that is, point-to-point sequential packet transfer from any network interface in $\overline{E}$ to each of its receiving network interface(s) is guaranteed.

<Proof>: (a) is clear since, during the construction of a data packet flow pattern on $\overline{G}$, a common LCN can be chosen for the two switch interfaces at ends of each link in $\overline{L}$. (b) holds since each multicast packet switch has at least the weak sequencing property.

[Definition 3.2]:

a. Given a $\overline{E}$, the sending/receiving relationship among all network interfaces in $\overline{E}$ is represented by a N-by-N transmission matrix: TM($\overline{E}$), where N is the number of network interfaces in $\overline{E}$. TM($\overline{E}$)[i,j] is 1 if RCj receives packets from SC i, and 0 otherwise.
b. Given two subsets X and Y of $\overline{E}$, the submatrix TM(X,Y) is obtained from TM($\overline{E}$) by retaining only those sender components in X and only those receiver components in Y. Let TM($\overline{E}_{1,u}$, $\overline{E}_{1,d}$) and TM($\overline{E}_{1,d}$, $\overline{E}_{1,u}$) be represented by $TM_{1,u,d}$ and $TM_{1,d,u}$, respectively.

Given a data packet flow pattern on $\overline{G}$, a TM($\overline{E}$) can be easily obtained by tracing data packet flows from each network interface in $\overline{E}$.

By imposing different requirements on data packet flow patterns on $\overline{G}$, four flavors of multicast connections are defined.

[Definition 3.3]: Given a $\overline{G}$, a data packet flow pattern on $\overline{G}$ is a *vanilla multicast connection*, if it satisfies the multicast condition: There exists at least one network interface in $\overline{E}$ from which the packet stream is destined to two or more network interfaces in $\overline{E}$. These network interfaces are referred to as multicast sources (MSs). The representation VMC($\overline{G}$) will be used to show the relationship between a vanilla multicast connection and its associated $\overline{G}$.

The multicast condition implies that: (1) At least one multicast packet switch in $\overline{S}$ will duplicate packets; and (2) The TM($\overline{E}$), obtained from any VMC($\overline{G}$), has at least one row containing two or more 1's. From this point on, only TM($\overline{E}$)'s having at least one row containing two or more 1's are considered. Given a $\overline{G}$, a TM($\overline{E}$) with the weak sequencing condition may not be satisfied by a VMC($\overline{G}$).

[Theorem 3.1]: Given a $\overline{G}$, a TM($\overline{E}$) with the weak sequencing condition can be satisfied by a VMC($\overline{G}$), if and only if it has the following VMC property: For any link 1 in $\overline{L}$, if $TM_{1,u,d}$ (or $TM_{1,d,u}$) contains two or more non-zero rows, these rows must be identical. In other words, every sender component in $\overline{E}_{1,u}$ (or $\overline{E}_{1,d}$) sending packets to the receiver components in $\overline{E}_{1,d}$ (or e,ovs/E/ $1,u$) must have identical destination subsets of $\overline{E}_{1,d}$ (or $\overline{E}_{1,u}$).

<Proof>: The sufficient condition is shown by contradiction. Assume that there exists a link 1 in $\overline{L}$ so that $TM_{1,u,d}$ contains different non-zero rows. This implies that there exist sender components $e_1$ and $e_2$ in $\overline{E}_{1,u}$ and receiver components $e_3$ and $e_4$ in $\overline{E}_{1,d}$ such that TM({$e_1$, $e_2$}, {$e_3$, $e_4$}) is either FIG. 9(a) or (b). In FIG. 9(a), SC $e_1$ sends packets to both receiver component, $e_3$ and $e_4$, and SC $e_2$ only to RC $e_3$. In FIG. 9(b), SC $e_1$ only sends packets to RC $e_3$, and SC $e_2$ only to RC $e_4$. Since $\overline{G}$ is an acyclic graph, there exists a MPS $\hat{s}$ in $\overline{G}_{1,d}$ so that packet flows from SCs $e_1$ and $e_2$ will enter its switch interface A via link $\hat{1}$, as shown in FIG. 9(c), and packet flows destined to RCs $e_3$ and $e_4$ will leave from switch interfaces B and C, respectively.

With a single LCN associated with link $\hat{1}$, packets from SCs $e_1$ and $e_2$ will have the same LCN in their headers when they are sent over link $\hat{1}$. Since one LCN only indexes one entry in the packet translation table of switch interface A, packets with the same LCN cannot be duplicated and routed to different subsets of outgoing switch interfaces. Therefore, the desired data packet flow pattern within MPS $\hat{s}$ to support the submatrices in FIG. 9(a)–(b), can not be achieved. This implies that the TM($\overline{E}$) can not be implemented by any VMC($\overline{G}$). The above conclusion is also true when $TM_{1,d,u}$ contains different non-zero rows.

Next the necessary condition is proved. Let $E_{u,1}$ and $E_{d,2}$ (or $E_{d,1}$ and $E_{d,2}$) be two subsets of $\overline{E}_{1,u}$ (or $\overline{E}_{1,d}$), so that $TM(E_{d,1}, E_{u,1})$ (or $TM(E_{u,2}, E_{d,2})$) contains all the 1's in $TM_{1,d,u}$ (or $TM_{1,u,d}$). The corresponding packet flow models of $TM(E_{d,1}, E_{u,1})$ and $TM(E_{u,2}, E_{d,2})$ are shown in FIG. 10, in which MPSs $\hat{s}_1$ and $\hat{s}_2$ both have pattern-1 data packet flow patterns. Let LCN n be chosen for link 1, then packets from each sender component in $E_{u,2}$ and $E_{d,1}$ will use LCN n when they are sent over link 1. To achieve these two data packet flow patterns, let the routing field in the switch header entry of the packet translation table at switch interface A (or SI B, resp.), indexed by LCN n, identify a set of outgoing links from which packets are transmitted to the receiver component in $E_{u,1}$ (or $E_{d,2}$).

Three natural vanilla multicast connections over the multicast packet switching network are given below.

a. Point-to-multipoint (Pattern-1): There is only one multicast source and each multicast packet switch in the vanilla multicast connection has pattern-1 data packet flow pattern.
b. Point-to-multipoint with upstream capability (Pattern-2): There is only one multicase source and each multicast packet switch in the vanilla multicast connection has pattern-2 data packet flow pattern.
c. Multipoint-to-multipoint (Pattern-3): In this vanilla multicast connection, each network interface is a multicast source and each multicast packet switch has pattern-3 data packet flow pattern.

Most data applications require reliable communication. To provide a network-based edge-to-edge reliable service to those multicast applications that require completely error-free transmission and that do not employ some higher-layer error control protocol, the multicast virtual circuit is introduced.

[Definition 3.4]: A *multicast virtual circuit* is a vanilla multicast connection which also satisfies the reliable condition: Point-to-point reliable packet transfer from any network interface to each of its receiving network interfaces is guaranteed.

There are two issues associated with a multicast virtual circuit.

1. Since a vanilla multicast connection may have multiple senders, a multipoint-to-multipoint error control protocol must be exercised among all network interfaces.
2. Given a $TM(\overline{E})$ with the vanilla multicast connection properties, a $VMC(\overline{G})$ can be set up to meet the desired information flow relationship among users. However, this $VMC(\overline{G})$ is only concerned with transmission of data (or information) packets, and there may not exist paths in it for returning acknowledgements (ACKs).

One approach to address the second issue is described below. If the $VMC(\overline{G})$ of a given $TM(\overline{E})$ also provides paths for returning acknowledgements, it will be used to transmit both data and acknowledgements. Otherwise, a a $TM'(\overline{E})$ is obtained, where $TM'(\overline{E})[i,j]$ is 1 if $TM(\overline{E})[i,j]$ or $TM(\overline{E})[j,i]$ is 1. If the $TM'(\overline{E})$ still has the vanilla multicast connection properties, a new $VMC(\overline{G})$ is then set up to support the desired information flow relationship represented by the $TM(\overline{E})$ and provide necessary acknowledgement paths. In both cases, some network interfaces may receive undesired data packets and/or acknowledgements. Therefore, two address fields—the addresses of the sending network interface and the receiving network interface—are reserved in the error control header so that each network interface can discard undesired incoming packets. The second field is used only by the acknowledgements.

A vanilla multicast connection and a multicast virtual circuit are not concerned with the sequencing relationship across multiple senders. Although most multicast applications can be supported by a vanilla multicast connection or a multicast virtual circuit, some multicast applications may request the multicast packet switching network to provide a multicast service which maintains the sequencing relationship across multiple senders. A strong multicast connection and a strong multicast virtual circuit are introduced to provide a network-based strong sequencing mechanism to those multicast applications that require strong sequential transmission and that do not employ some higher-layer strong sequencing protocol.

[Definition 3.5]: A vanilla multicast connection is a *strong multicast connection*, if it also satisfies the strong sequencing (SS) condition: the sequence of packet streams arriving at a set of network interfaces with two or more common multicast sources are identical with respect to the input streams from common multicast sources.

To investigate the relationship between transmission matrices with the strong sequencing condition and strong multicast connections, consider those transmission matrices which have the vanilla multicast connection properties stated in Theorem 3.1 and can be implemented by a vanilla multicast connection.

[Definition 3.6]:

a. Given a matrix, its two columns (or two rows) $\alpha$ and $\beta$ are said to be coupled, if column (or row) $\alpha$ contains at least two 1's at the same row (or column) position as column (or row) $\beta$.
b. A matrix with at least two coupled columns is said to have the strong coupling property, if its columns (or rows) can not be partitioned into two disjoint subsets such that there exists one column (or row) in each subset and these two columns (or rows) are coupled.
c. A $TM(\overline{E})$ having the vanilla multicast connection property and at least two coupled columns is called a coupled transmission matrix and represented as $CTM(\overline{E})$.

It is clear that for each non-$CTM(\overline{E})$ with the vanilla multicast connection property, its associated $VMC(\overline{G})$ is a $SMC(\overline{G})$. From this point on, consider only $CTM(\overline{E})$s. The problem is summarized below.

[Problem 3.1]: Given a $CTM(\overline{E})$, find the sufficient and necessary condition such that its associated $VMC(\overline{G})$ is also a $SMC(\overline{G})$.

Based on Definition 3.5, the strategy to solve Problem 3.1 is to find out all those subsets of receiver components which have respective two or more common sender components and then check the strong sequencing condition for each subset separately. By using the following partition method, a $CTM(\overline{E})$ can be partitioned into a number of submatrices which have either no coupling property or the strong coupling property. Each submatrix corresponds to a partial packet flow of the associated $VMC(\overline{G})$. [$CTM(\overline{E})$ Partition Method]: Let C be initialized to include all the columns of the $CTM(\overline{E})$. The disjoint subsets $\{C_j | j=0, \ldots, m\ (>=1)\}$ of C can be generated from the following steps as C shrinks to an empty set.

Assume that the subsets $C_1, \ldots, C_{j-1}$ are already non-empty and the subset $C_j$ is empty.

Step 1:
If C contains only one column, then move the remaining column from C to $C_o$. In any case, stop if C is empty. Otherwise go to Step 2.

Step 2:
Find a column with the largest number of 1's, say ĉ, from C. Move ĉ from C to $C_j$.

Step 3:
For each column c in C, repeat the following procedure:
{If there exists a column in $C_j$ so that these two columns have the coupling property, then move c from C to $C_j$.}

Step 4:
If $C_j$ contains only ĉ, then move ĉ from $C_j$ to $C_o$. Go back to Step 1.

Let $\overline{E}_{r,j}$ be the set of receiver components corresponding to those columns in $C_j$. Clearly, $\overline{E}_{r,o}, \ldots, \overline{E}_{r,m}$ are disjoint.

By using similar steps as those above, the rows of each submatrix $TM(\overline{E}, \overline{E}_{r,j})$, $1 \leq j \leq m$, can be partitioned into a number of disjoint subsets $\{R_i, i=0, \ldots, n (\geq 1)\}$. Let $\overline{E}_{s,i}$ represent the set of sender components corresponding to the rows in $R_i$ and $TM_{i,j}$ represent the submatrix $TM(\overline{E}_{s,i}, \overline{E}_{r,j})$. Clearly, $\overline{E}_{s,o}, \ldots, \overline{E}_{s,n}$ are disjoint.

$C_o$ and $R_o$ may be empty; however, $C_1$ and $R_1$ always exist by the definition of $CTM(\overline{E})$. Based on Definition 3.5, it is clear that the strong sequencing condition of the $CTM(\overline{E})$ is satisfied, if and only if the strong sequencing condition of each submatrix obtained in the partition algorithm is satisfied. Since $TM(\overline{E}, \overline{E}_{r,o})$ and $TM_{o,j}$, $1 \leq j \leq m$, if they exist, do not have the coupling property, the packet flows corresponding to these submatrices are ignored while the strong sequencing condition of the $CTM(\overline{E})$ is checked. However, each $TM_{i,j}$, $1 \leq i \leq n$, $1 \leq j \leq m$, has the strong coupling property. Therefore, to deal with Problem 3.1, consider these $TM_{i,j}$, $1 \leq i \leq n$, $1 \leq j \leq m$, and deal with their strong sequencing conditions separately. Note that each $TM_{i,j}$ has the vanilla multicast connection property since the $CTM(\overline{E})$ does. Depending on the type of multicast packet switches, the sufficient and necessary condition that the strong sequencing condition of a $TM_{i,j}$ can be satisfied will be different. The following definition is needed for describing the main results which are summarized in Theorem 3.2 and Theorem 3.3.

[Definition 3.7]: Any link 1 in $\overline{L}$ cuts $\overline{G}$ into two disjoint subgraphs $\overline{G}_{l,u}$ and $\overline{G}_{l,d}$. Let $\overline{E}_{s,i,l,u}$ and $\overline{E}_{s,i,l,d}$ contain those sender components in $\overline{G}_{l,u}$ and $\overline{G}_{l,d}$, respectively. Also, let $\overline{E}_{r,j,l,u}$ and $\overline{E}_{r,j,l,d}$ contain those receiver components in $\overline{G}_{l,u}$ and $\overline{G}_{l,d}$, respectively.

[Theorem 3.2]: Assume all the multicast packet switches are w-MPSs. For any given $TM_{i,j}$, $1 \leq i \leq n$, $1 \leq j \leq m$, its strong sequencing condition can be satisfied, if and only if, there exists an inter-MPS link in $\overline{L}$ such that if all the sender components in $\overline{E}_{s,i}$ are in $\overline{G}_{l,u}$ (or $\overline{G}_{l,d}$), then all the receiver components in $\overline{E}_{r,j}$ must be in $\overline{G}_{l,d}$ (or $\overline{G}_{l,u}$).

<Proof>: Since w-MPSs only have the weak sequencing property, it is clear that the strong sequencing condition among the receiver components in $\overline{E}_{r,j}$ can be satisfied if and only if these receiver components receive packets via a single link, where all packet streams originating from the sender components in $\overline{E}_{s,i}$ are multiplexed into a single interleaved packet stream. In this cast, the value of each element in $TM_{i,j}$ is 1, since $TM_{i,j}$ has the vanilla multicast connection property and the strong coupling property.

[Theorem 3.3]: Assume all the multicast packet switches are s-MPSs. For any given $TM_{i,j}$, $1 \leq i \leq n$, $1 \leq j \leq m$, its strong sequencing condition can be satisfied, if and only if, for any inter-MPS link 1 in $\overline{L}$, there do not exist a sender component and a receiver component in $\overline{G}_{l,u}$ and a sender component and a receiver component in $\overline{G}_{l,d}$ such that these two receiver components have these two sender components as common multicast sources. In other words, there do not exist four respective non-empty subsets, say $\overline{E}_{s,i,l,u}$, $\overline{E}_{s,i,l,d}$, $\overline{E}_{r,j,l,u}$ and $\overline{E}_{r,j,l,d}$, of the sets $\overline{E}_{s,i,l,u}$, $\overline{E}_{s,i,l,d}$, $\overline{E}_{r,j,l,u}$ and $\overline{E}_{r,j,l,d}$, such that the value of each element in $TM(\{\overline{E}_{s,i,l,u}, \overline{E}_{s,i,l,d}\}, \{\overline{E}_{r,j,l,u}, \overline{E}_{r,j,l,d}\})$ is 1.

<Proof>: When the sender components in $\overline{E}_{s,i}$ and the receiver components in $\overline{E}_{r,j}$ are connected to the same multicast packet switch, the claim is true since the s-MPS has the strong sequencing property. Therefore, it suffices to prove the case when the sender components in $\overline{E}_{s,i}$ and the receiver components in $\overline{E}_{r,j}$ are not connected to the same multicast packet switches. Since $TM_{i,j}$ has the vanilla multicast connection properties, FIG. 11(a) depicts an equivalent two-MPS model with respect to each inter-MPS link 1. Multicast packet switches 1 and 2 represent the two multicast packet switches which link 1 connects. The sender components in $\overline{E}_{s,i,l,u}$ and the receiver components in $\overline{E}_{r,j,l,u}$ are connected to multicast packet switch 1, and the sender components in $\overline{E}_{s,i,l,d}$ and the receiver components in $\overline{E}_{r,j,l,d}$ are connected to multicast packet switch 2.

The packet flow model corresponding to $TM(\overline{E}_{s,i}, \overline{E}_{r,j,l,u})$ is shown in FIG. 11(b). This is equivalent to the case that the sender components in $\overline{E}_{s,i}$ and the receiver components in $\overline{E}_{r,j,l,u}$ are all connected to multicast packet switch 1, and therefore, the strong sequencing condition among the receiver components in $\overline{E}_{r,j,l,u}$ with respect to the common sender components in $\overline{E}_{s,i}$ is satisfied. Similarly, by removing $\overline{E}_{r,j,l,u}$, $\overline{E}_{s,i,l,d}$ and $\overline{E}_{s,i,l,u}$ from FIG. 11(a), respectively, the strong sequencing condition among the receiver components in $\overline{E}_{r,j,l,d}$ with respect to the common sender components in $\overline{E}_{s,i}$, the strong sequencing condition among the receiver components in $\overline{E}_{r,j}$ with respect to the common sender components in $\overline{E}_{s,i,l,u}$, and the strong sequencing condition among the receiver components in $\overline{E}_{r,j}$ with respect to the common sender components in $\overline{E}_{s,i,l,d}$ are also satisfied. Therefore, the only remaining case to check is when there exists at least one element in each of the four sets —$\overline{E}_{s,i,l,u}$, $\overline{E}_{s,i,l,d}$, $\overline{E}_{r,j,l,u}$ and $\overline{E}_{s,i,l,u}$, such that these receiver components have these sender components as common multicast sources.

The necessary condition is proved first. For any inter-MPS link 1 in $\overline{L}$, suppose there do not exist a sender component and a receiver component in $\overline{G}_{l,u}$ and a sender component and a receiver component in $\overline{G}_{l,d}$ such that these two receiver components have these two sender components as common multicast sources. This implies that the above remaining case does not exist. Therefore, the strong sequencing condition of the $TM_{i,j}$ is satisfied. Next, the sufficient condition is proved by contradiction. Consider FIG. 11(c), in which sender component A, sender component B, receiver component C and receiver component D are in $\overline{E}_{s,i,l,u}$, $\overline{E}_{s,i,l,d}$, $\overline{E}_{r,j,l,u}$ and $\overline{E}_{r,j,l,d}$, respectively, and sender components A and B are common multicast sources to receiver components C and D. If each of sender components A and B sends a packet to receiver components C and D at the same time, then receiver component C (or receiver component D) will receive the packet from sender component A (or sender component B) first. Therefore, receiver components C and D will not receive identical interleaved packet streams.

[Definition 3.8]: A *strong multicast virtual circuit* is a strong multicast connection which also satisfies the reliable condition: a set of network interfaces with two or more common multicast sources will receive identical interleaved packet streams with respect to the input streams from common multicast sources.

By executing multidestination error control among all network interfaces in a strong multicast connection, some retransmitted packets may exist. Without other means, each receiver component may put an original packet and a retransmitted packet coming from different multicast sources into different order, and the strong sequencing condition is violated. To solve this problem, each packet in a strong multicast virtual circuit carries a global time stamp. Time-stamp ordering assures that the strong sequencing condition among all the receiver components in a strong multicast virtual circuit is satisfied.

Various flavors of multicast connections provide various kinds of multicast services to users. A multicast application (MA) is an end-user's use for a multicast service or a collection of multicast-services. To achieve service integration, a multicast application is viewed by the users as an integrated service.

The single-media multicast applications, such as multi-destination file transfer, voice conferencing, etc, are generally supported by a suitable flavor of multicast connection. However, for those multimedia multicast applications (MMAs) involving two or more media, they may or may not be supported by a single multicast connection. Consider a multi-party interactive debugger. Two different scenarios are shown in FIG. 12 and FIG. 13, respectively. Each multimedia workstation (MMWS) contains a terminal (e.g. T1) and a voice bridge (VB) and is connected to a separate network interface. In FIG. 12, the editor program used for file debugging is a network server in an intelligent server node (ISN). Multiple multicast connections are used. The dashed lines interconnecting the editor program and the three terminals represent a pattern-2 multicast virtual circuit with the intelligent server node as the multicast source; the dotted lines interconnecting the three voice bridges represent a pattern-3 vanilla multicast connection. In FIG. 13, the editor program resides in multimedia workstation 1. As before, the users can request multiple multicast connections to support the multimedia multicast applications; or as an alternative, the users may request a single pattern-3 vanilla multicast connection for both data and voice. The latter results in a multimedia multicast connection, in which two media share the same logical channel number and are distinguished by different channel numbers. Its advantage is that the connection setup is done only once. Since the data are also sent via the pattern-3 vanilla multicast connection, multimedia workstation 3 (or multimedia workstation 2) needs to discard those incoming editor-program-destined editor commands generated at multimedia workstation 2 (or multimedia workstation 3). This data-packet-discarding is efficiently implemented in hardware. Multidestination error control for reliable data is executed at the multimedia workstations rather than the network interfaces. The voice sharing the same multicast connection with the other media shows an advantage of using distributed voice bridges.

In summary, the number of multicast connections needed to support a given multimedia multicast application generally depends on the location of servers and their relationships. For the local servers, such as the editor program and the voice bridges in FIG. 13, residing in the multimedia workstations, a single multicast connection or multiple multicast connections can be requested to support the communication among them. For the network servers, residing in the network interfaces or the intelligent server nodes, their locations are generally transparent to the users. Therefore, the users may need to request a separate multicast connection for each independent network-based service.

Multimedia Conferencing

The description of multimedia conferencing which follows is based on one particular exemplary embodiment, referred to herein as conference system 1000, shown in the diagram of FIG. 13. Computer support for group work can primarily address either asynchronization interaction or simultaneous (real-time) interaction among users. Electronic mail is an example which primarily addresses asynchronization interaction among users. Such systems are most useful when each user works according to their own schedule. For some situations, like crisis handling, real-time interaction is essential and more productive. In a real-time computer-based conference, people can share information simultaneously through their personal computers. The recent advancements in high speed networks and high performance workstations make it easier for users to have real-time multimedia communications. The medium can be voice, interactive data, image and video.

There are several existing real-time conference systems. Some of them, e.g. as disclosed in L. Aguilar, et al, "Architecture for a Multimedia Teleconferencing System," *Proceedings ACM SIGCOMM'86 Symposium*, August, 1986, H. C. Forsdick, "Explorations in Real-Time Multimedia Conferencing," *Proceedings of the 2nd International Symposium on Computer Message Systems*, IFIP, September, 1985, A. Poggio, et al, "CCWS A Computer-Based, Multimedia Information System," *Computer* 18, 10, October 1985, are constructed as specialized programs distributed among the conferees' computers. Generally these specialized programs can not invoke other applications. Consequently, pre-existing application programs had to be modified for each conference system.

Conference system 1000 (FIG. 13) and a few other systems, e.g. as disclosed in K. A. Lantz, "An Experiment in Integrated Multimedia Conferencing," *Proceedings of the Conference on Computer-Supported Cooperative Work'86*, December, 1986, S. R. Ahuja, J. R. Ensor, and D. N. Horn, "The Rapport Multimedia Conferencing System," *Proceedings of Conference on Office Information Systems*, March, 1988, allow any pre-existing applications, written for a single-user environment, to be invoked from within the frame-work of a conference. These pre-existing applications, which produce useful data to a collaboration, can be invoked without modifications. These systems also allow programmers to develop typical applications without having to deal explicitly with the conference issues.

Another characteristic of conference system 1000 is that it is based upon fast packet network technology. The transport layer and network layer software in system 1000 can support multimedia packets (voice, data and image) going through a single packet network and can preserve temporal synchronization among different media. Temporal synchronization is important for real-time multimedia communication. For example, a conferee may highlight different parts of a text file sequentially while making voice comments on highlighted text. The highlighted text and the voice comments should appear synchronously at all conference workstations. System 1000 can also record voice and data into a multimedia file with temporal synchronization preserved. The recorded file can be reviewed by a user asynchronously or played back in a real-time conference. Voice annotation on a recorded file is also supported in system 1000. A user may record a first call while communicating on a second call.

In addition to invoking pre-existing applications and recording a conference, system 1000 also supports changing conference configurations dynamically. A conference has two basic elements: conferees and shared applications. A conference configuration is changed by changing these two elements. In system 1000, a workstation may have multiple conferences at one time. A conference configuration can be changed by adding or deleting applications to a conference dynamically. It can also be changed by merging two conferences into one conference or splitting a single conference into two conferences. Thus, the conferees in the resulting conference are changed.

Usually when an application is invoked in a conference, it should be shared by all conferees in that conference. But in some situations, it may be desirable to restrict particular conferees from accessing the shared application data (either inputting commands or seeing outputs). The ability to change the conference configuration and the ability to control access to applications greatly increase the flexibility of real-time desktop conferences.

In the description which follows, a graphical user interface (UI) is presented which allows users to perform these conference functions: setting up a conference, adding (or deleting) applications, controlling the access to an application, recording a conference, and merging (or splitting) conferences.

The graphical user interface is based on an important idea—— the conference room notion. A conference room is where the conferees meet and see the shared application. If an application is moved into the conference room, it will be seen and be used by the conferees inside the room. If an application is moved out of the room, it will no longer be shared by the conferees. The configuration of a conference is the contents of the room; the conferees in the room and the applications in the room. For any conference, there must be some rules concerning who can speak when, who has access to sensitive data, etc. This is referred to as access control. Conferees and applications in one room may be moved to merge with another room to form a joint conference. A joint conference may be split into two separate conferences. In the following, basic mechanisms for setting up a conference and an application are described first. The use of menus and buttons in the UI to perform various conference functions is then described in detail.

In conference system 1000, the multimedia virtual circuit, as disclosed in U.S. Pat. No. 4,905,231, issued to W. F. Leung et al. on Feb. 27, 1990, and in W. F. Leung, G. W. R. Luderer, M. J. Morgan, P. R. Roberts, and S. C. Tu, "A Set of Operating System Mechanisms to Support Multimedia Applications," *Proceedings of 1988 International Zurich Seminar on Digital Communica-*

*tions*, March 1988, provides network layer and transport layer interfaces to the session layer. One important characteristic of the multimedia virtual circuit is that all of the media involved in a call are multiplexed into a single virtual circuit. The network layer deals with the multimedia virtual circuit as a whole. In the transport layer, the virtual circuit is divided into multiple channels, where each channel transports one medium. The primary objective of multiplexing multiple channels into a virtual circuit is to provide temporal synchronization and coordination for a multimedia call.

In system 1000, each conference has one virtual circuit connection. To create a conference, the session layer software first creates a multicast (or point-to-point) virtual circuit to connect to remote conferees. The newly created virtual circuit has one signalling channel. The session layer uses this signalling channel to negotiate with its counterparts to agree on the successive channels and applications. In system 1000, one channel is dedicated to one application. Multiple applications (channels) can be created for a conference. The phone device is treated as an application in the conference model. Data applications can be one of the three types: the traditional character-based application programs, the X-based graphical based programs and special conference programs.

For traditional character-based application programs, such as ksh, a driver referred to as a connector (disclosed in W. F. Leung, G. W. R. Luderer, M. J. Morgan, P. R. Roberts, and S. C. Tu, "A Set of Operating System Mechanisms to Support Multimedia Applications," *Proceedings of 1988 International Zurich Seminar on Digital Communications*, March 1988), is used for interprocess communication. It provides flexible interconnectivity that can multicast data from a source to several selected destinations and concentrate data from several sources to a single destination. FIG. 14 illustrates the use of the connector and the virtual circuit in sharing a character-based application program (bin/ksh) by two parties. The process devp is needed for transferring a character stream between drivers. It is important to note that only one copy of the program is executed per application shared by a conference. This implementation of sharing character-based applications allows all parties to input commands to the application simultaneously.

In addition to traditional character-based applications, graphical applications based on the X windowing system (disclosed in R. W. Scheifler, and J. Gettys, "The X Window System," *ACM Transactions on Graphics*, April, 1986), can also be invoked in our conference system without modifications. FIG. 15 illustrates the sharing of a graphical program xprog by two parties. The X window servers and xprog are unmodified. The pseudo server performs necessary X resource identifier translation. The pseudo servers at the stations which do not run the application program perform the translation. Pseudo servers also control the flow of X events from X servers to the application program. Unlike the implementation of character-based applications, this implementation only allows one party to input at a time. If party 2 has the control to input, then the pseudo server will take the event stream only from party 2 and feed it to the application program.

Data application programs designed specially for collaborative work can also be integrated into system 1000 as long as they use the X windowing system and the multimedia virtual circuit as the transport vehicle.

As an example, a cut-paste program in system 1000 allows conferees to share images from workstation displays. When a cut-paste application is created, each station runs a copy of the cut-paste program.

Voice applications (phone) are different from data applications. Except for voice recording, voice packets are transmitted to and from the interface hardware directly without going through the user space.

As stated before, one conference has one virtual circuit connection. A conference may have multiple conferees and multiple applications. To change a conference configuration, any conferee can dynamically add or delete an application. When an application is created for a conference, it is shared by all the conferees unless access rights are restricted. In the present embodiment, two conferences can be merged into one conference. When two conferences are merged, two virtual circuits are merged into one virtual circuit. A conference can also be split into two conferences such that each conference has a separate virtual circuit.

Merging and Splitting Multimedia Calls

Figure 1:
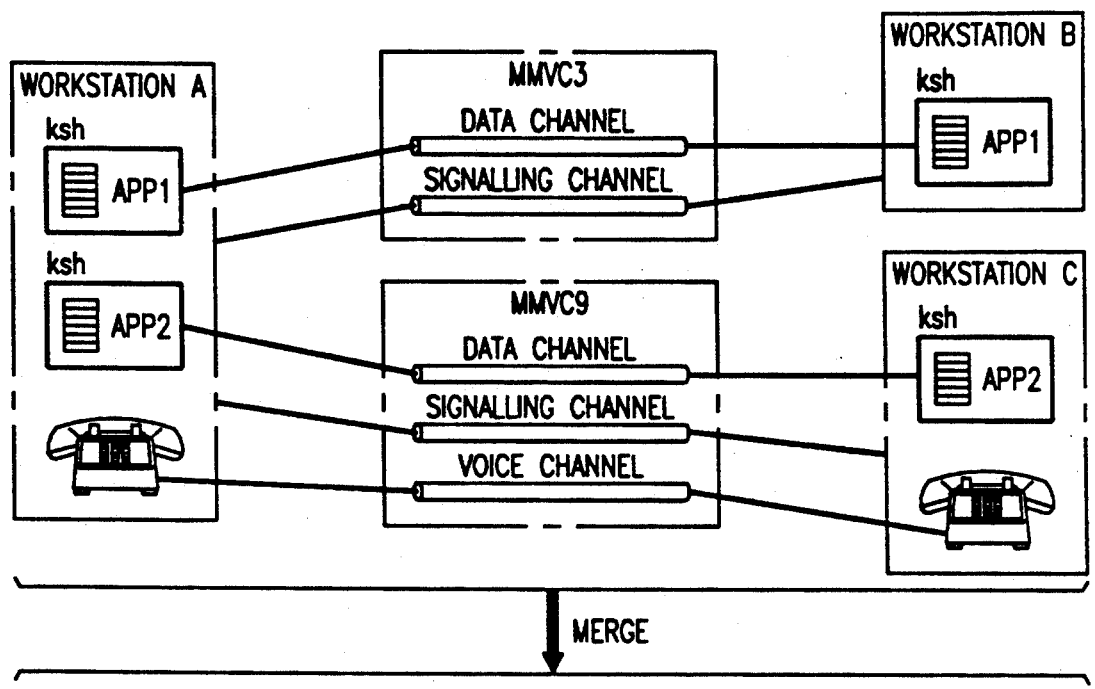
FIG. 1 is a diagram illustrating the merger of two, multi-channel calls into a single call.
Figure 1:
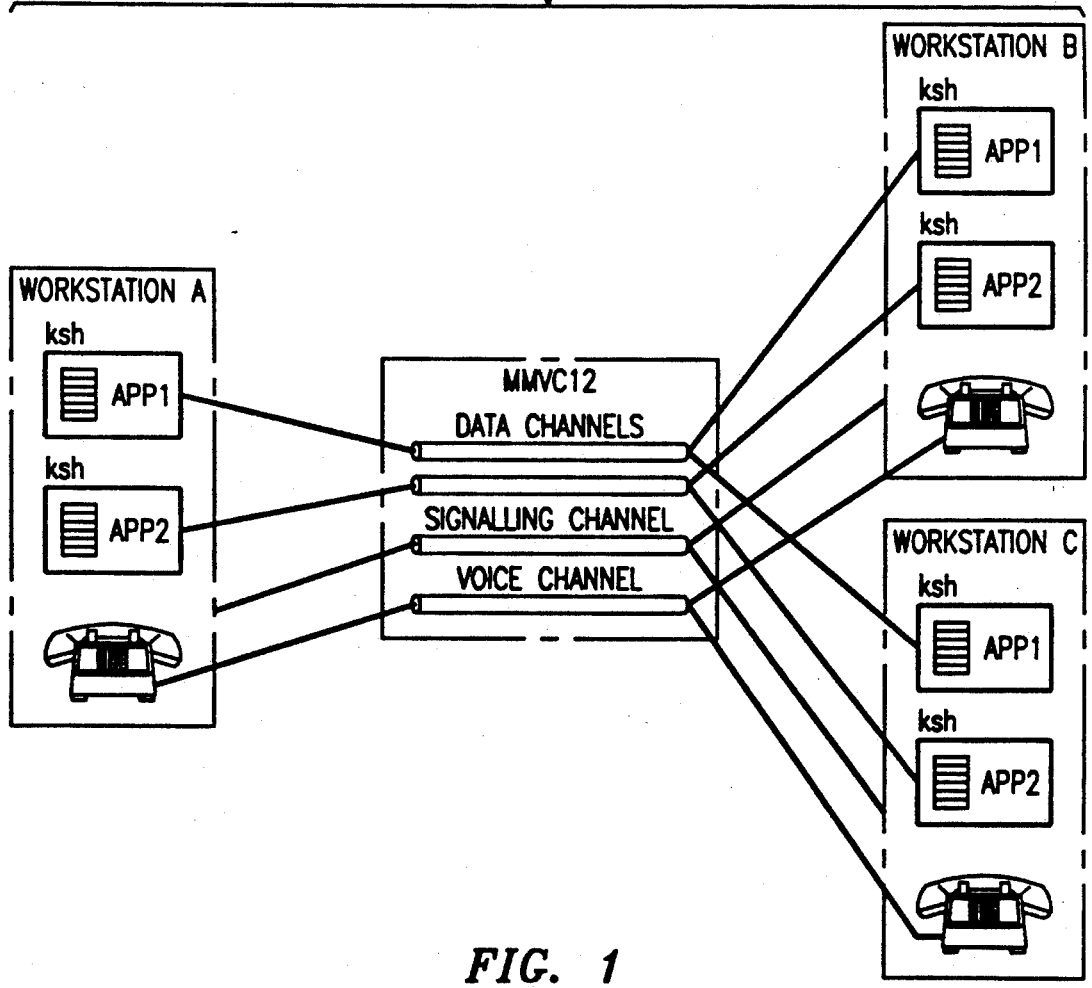

The merge operation entails combining two MMVCs (multimedia multicast virtual circuits) into one MMVC (FIG. 1). The set of destination end points of the resulting MMVC is the union of the destinations in the two original MMVCs; after merging MMVC 3 and MMVC 9 the resulting MMVC 12 has destinations A, B, and C.

Each of the original MMVCs contains one signalling channel plus other application channels (voice, data, or image). The resulting merged MMVC contains one signalling channel plus the sum of all the application channels. That is, if X and Y are the numbers of application channels in the two MMVCs to be merged, then there will be X+Y−1 application channels in the resulting merged MMVC. FIG. 1 shows that workstation B has a voice channel and a new data channel that did not exist before the merge, and workstation C has a new data channel.

In the present embodiment, a conference is not allowed to have more than one phone. This issue arises when two conferences, each with its own phone, are merged. At the session layer, each conference is supported by one MMVC. When two conferences are merged, their corresponding MMVCs are merged at the transport layer.

In alternative embodiments, applications may require multiple voice channels. Therefore, this issue is resolved at the session layer. It is the session layer's job to close one of the voice channels after a merge of two MMVCs each containing a voice channel. Of course, the conferees need not be aware of these details. To them only one phone appears in the conference room after a merge, as is expected.

Figure 2:
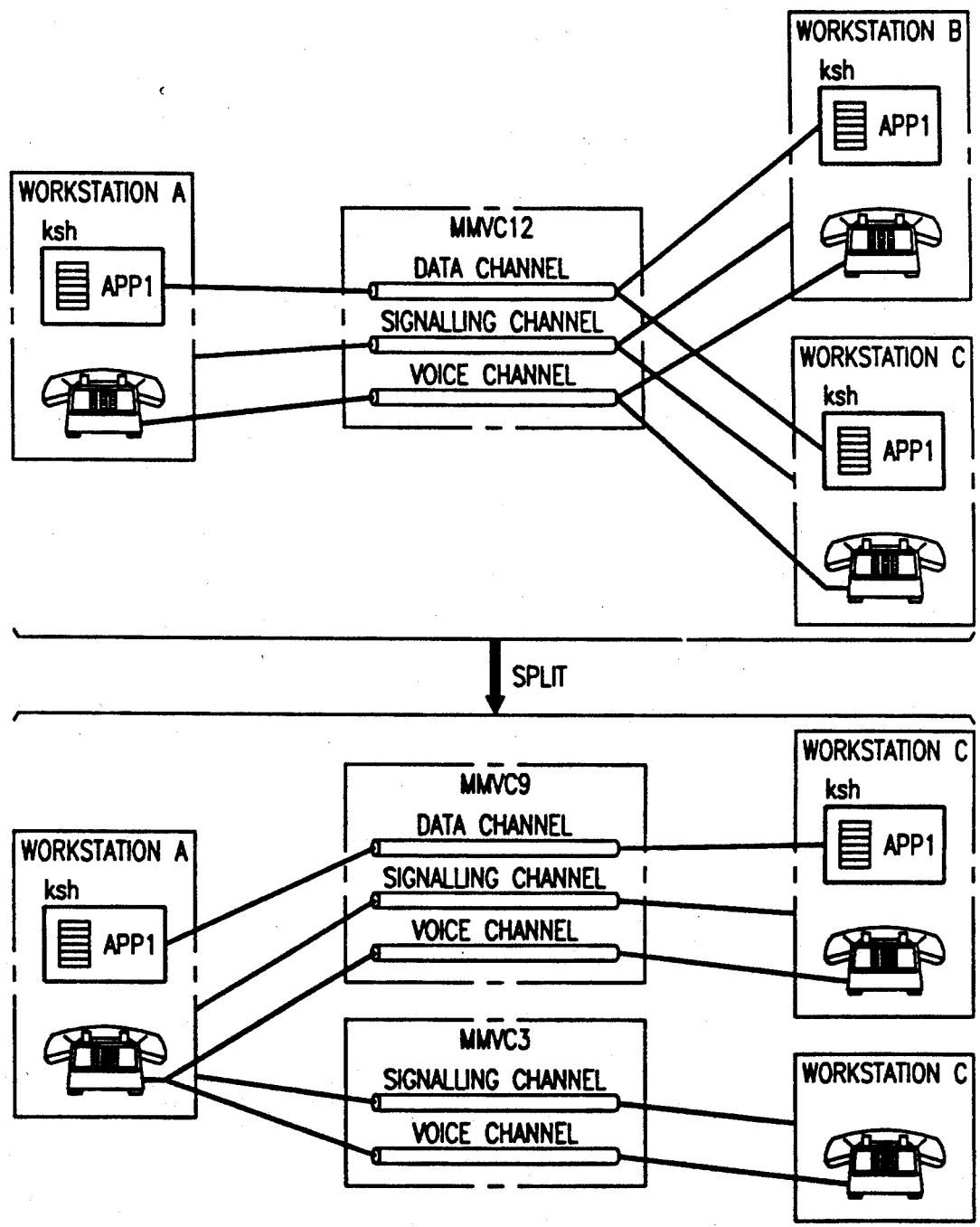
FIG. 2 is a diagram illustrating the splitting of a single, multi-channel call into two calls.

When one MMVC is split into two MMVCs (FIG. 2) the session layer specifies the destination end points and the application channels that will exist in the resulting MMVCs. Each of the two resulting MMVCs will have a subset of the original application channels plus one signalling channel and a subset of the original destination end points. It is further required that each destination end point be a member of at least one of the two resulting MMVCs. Similarly, each application channel should appear in at least one of the two resulting MMVCs. In other words, destination end points and channels cannot be dropped as part of the split operation.

The originator of a merge operation is required to be a member both MMVCs to be merged. Similarly, the originator of a split operation is required to be a member of both of the resulting MMVCs.

User Interface

There are three levels of windows presented to the conferees of a workstation: UI windows, room windows and application windows. A UI window has menus to (1) setup and tear down multiparty (or two party) conference calls, (2) add and delete applications in a conference call, (3) merge and split conference calls, and (4) record a conference.

There is a room window for each conference call from or to a workstation. Each room window contains applications and conferees of a conference. Since a workstation may have multiple conferences, a room window provides a graphical view of each conference and its components. Access control is provided through a room window.

There are application windows which applications create. Usually an application window consists of a top level window which contains other subwindows inside its boundary. For each application in a conference, an application window will appear in each station which participates in this conference. The application window is the place where shared data from applications are displayed and is where the commands to the application are input.

When UI starts to run, it does two things: (1) starts a listen process to listen to incoming call requests from other workstations, and (2) displays a main menu to accept user commands. The main menu is shown in the FIG. 16. The main menu has two rows of command buttons and a face icon which identifies the conferee's workstation. The buttons in the top row represent operations on conference rooms and objects in conference rooms. An object may be an application or a conferee. The buttons in the second row are used to create objects (applications) in a room. The command buttons from left to right in the first row are: room button, quit button, record button, trash button, merge button and split button. The command buttons in the second row are: directory button, phone button, ksh button, X button, and cut-paste button. In this user interface, a command button (or a window) is selected by positioning the cursor on the button (or the window) and pressing the left most mouse button. The use of the command buttons to construct a conference configuration is now described.

Figure 17:
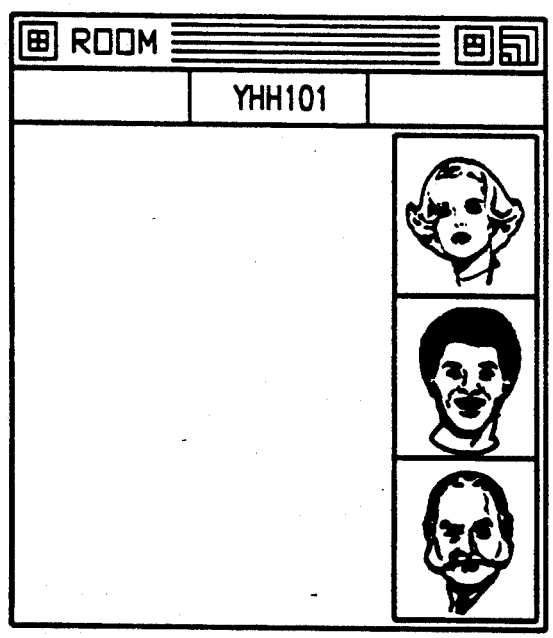
Figure 18:

To set up a conference, a conferee first creates a room by selecting the room button. A room with only the originating conferee icon in the room will appear. Each room has a room window and a room identifier window (which is on the top of the room window). Each room has a unique room identifier shown in the room identifier window. When the directory button is selected, UI will display a directory which contains face icons (FIG. 18) representing all the people that can be reached from this workstation. To make a call, the originating conferee puts other conferees into the room by first selecting conferees and then selecting the room window. The UI will initiate a call to the remote conferees by opening a multimedia virtual circuit connection with conferee addresses as parameters. If the connection is established successfully, the originating UI will add the remote conferee icons into the room. Otherwise, the room will only have the originating conferee icon. If a call fails, the originating conferee can try again by using the same procedure. If a call succeeds, the remote site workstations will have a conference room which is the same as the conference room at the originating site. A conference room is said to be initially established when a call connection is established. The first face icon in the established room is the originator and the remaining icons show the other parties that are also in the conference. FIG. 17 shows an established room with three parties and FIG. 18 shows a directory. An established room with no applications has only one signalling channel in the connection. UI uses this signalling channel to communicate session layer messages for this room.

After the call has been established, applications can then be added into the room. Unlike conference members, applications can be added or deleted dynamically. An application is added to a room by first selecting the application command button in the main UI menu, and then selecting the room. When an application is added to (deleted from) a room, a channel is added to (deleted from) the existing connection. By convention, the first application added to a conference room is a phone. Conferees can use voice communication for negotiating and for coordinating the other applications to be added to the conference room. A phone icon will appear in the room when a phone is added to a room. The phone is initially onhook. It goes offhook when the phone icon in the conference room is selected. An access control menu with phone options is displayed, allowing conferees to operate their phones in different modes.

Only one phone can be added to a room. However, many data applications can be added to a room. There are two major classes of data applications that can be used in the present embodiment: traditional character-based applications and graphic-based X applications. These applications are typically written for a single user. For adding traditional character-based applications, conferees select the ksh button first and then the conference room window. A ksh icon will appear in the room and a ksh application window which is created by the ksh application process will also appear on the display. Traditional character-based application can then be invoked through the ksh application window. To link the icon to the application window, the icon has a unique name assigned by UI which will also be the title of the application window and which will appear in the title bar.

For X applications a directory menu is provided when the X button is selected. Conferees select an application from the menu and select the room to create the application in that room. Similar to ksh applications, an icon and an application window will appear when an X application is added to a room.

Figure 19:
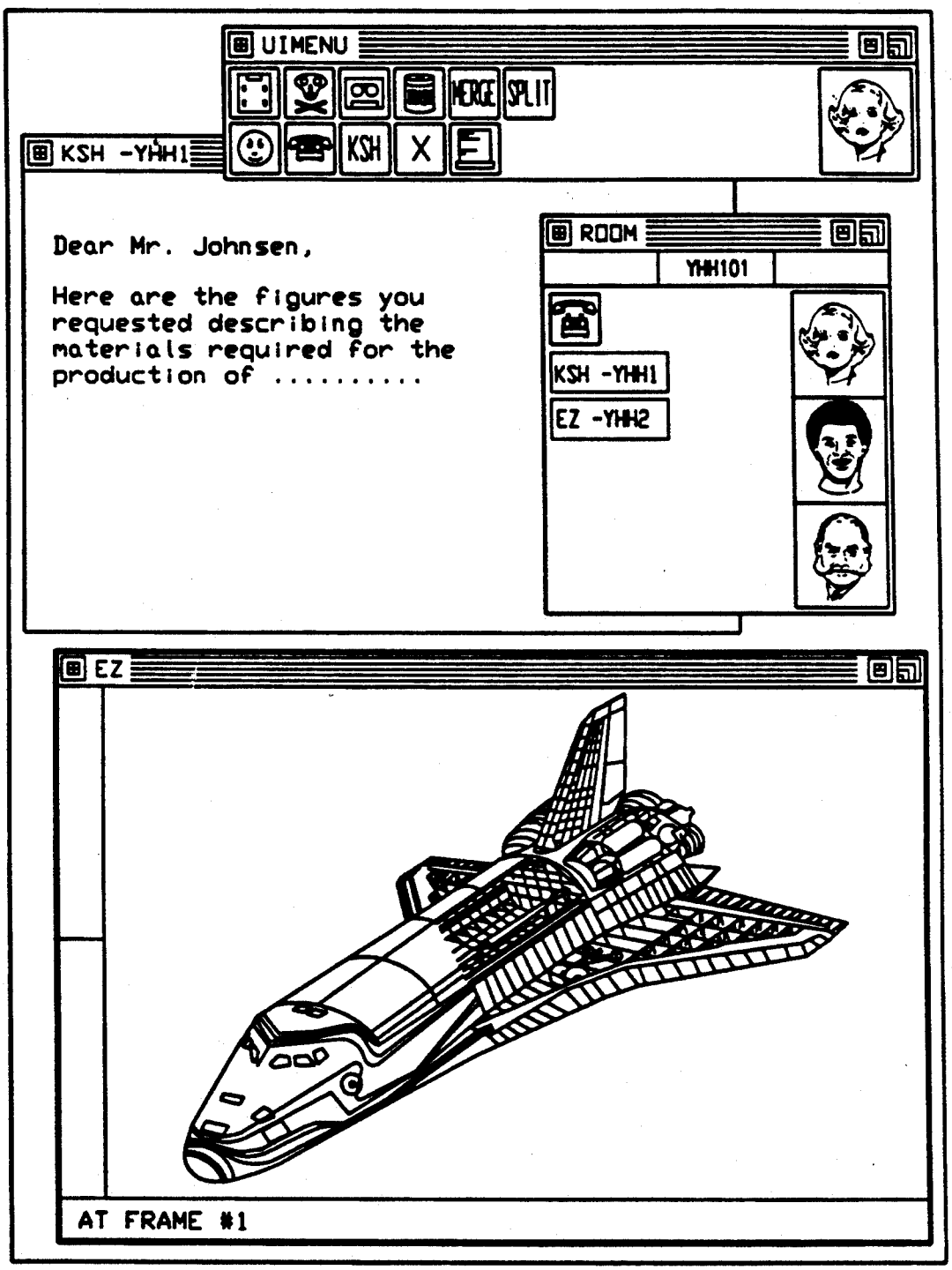

The cut-paste button is used to add a cut-paste application to a room. The cut-paste program acts like a chalkboard which allow conferee to cut images from other windows in the display into the cut-paste application window. It also allow conferees to erase (cut-out) images from the cut-paste window. FIG. 19 illustrates a display for a conference room having a phone, a ksh application, and an X application (ez editor).

For applications invoked from the ksh button and from the X button, a single copy of the program runs at the station where the application is invoked. A point-to-multipoint channel with upstream capability is needed for these applications. For cut-paste applications, each station runs its own copy of the program. A multipoint-to-multipoint channel is needed for this implementation.

Any application can be deleted from a conference room by selecting the trash button and then selecting the application icon in the room. The application icon and the application window will disappear when an application is trashed. The channel associated with that application will also be deleted. The trash button can also be used to terminate a conference room by selecting the room identifier window. When a room is trashed all applications are deleted first, then the virtual circuit connection is terminated. The quit button is used to exit the user interface and terminate all ongoing conferences.

In most conference situations, when an application is shared, all conferees should have the same right to receive outputs from the application and to input commands to the application. In some situations, the input or the output of an application may be restricted due to security, application features or implementation requirements. There are many situations that access control will be useful. For example, one may share some private data with a subset of conferees during a period of time. Another example is if one is participating in two conferences, he/she may alternatively listen and talk on one conference and listen on another conference. The control of a conferee transmitting to or receiving from an application is called access control. The capability for a conferee to access a shared application is called the conferee's access capability. An access control policy describes how to assign access capabilities and how to change access capabilities.

There can be many policies for access control. In the present embodiment, the transport layer software can be requested by the software above to discard incoming packets from a particular conferee on a particular channel. This mechanism is used to implement access control. The transport layer is flexible to allow other access control policies.

The access capability basically has four levels: input and output, output only, input only and no io. For the phone application, these four levels translate to hear and talk, hear only, talk only (can't hear) and neither hear nor talk. We define a strict order on the degree of control on these four levels: input and output has the highest order and no io has the lowest order. Our access control policy is as follows. When an application is added to a conference room, each conferee is given a initial access capability and a ceiling access capability based on the type of the application. For a phone application, the initial capability is no io for each conferee (equivalent to onhook) and the ceiling capability is input and output. For ksh and cut-paste applications, each conferee has input and output initial capability and ceiling capability. For X applications, the controller has input and output initial and ceiling capabilities. All others have output only initial and ceiling capability. The capability levels implemented for each application are different from application to application. Phone has all four levels. Ksh and cut-paste has three levels: input and output, output only and no io. X applications only have two levels: input and output and no io.

Only the controller can change another conferee's ceiling capability. When the controller moves a conferee's current capability, the new level becomes the ceiling capability of that conferee.

A conferee can change his/her own current capability to a lower or a higher capability level. A conferee can move to a higher level as long as that level does not exceed his/her own ceiling capability. When a phone application is added to a room, it is initially onhook (no io). Each conferee needs to change the capability to input and output in order to have a voice conference.

Figure 20:
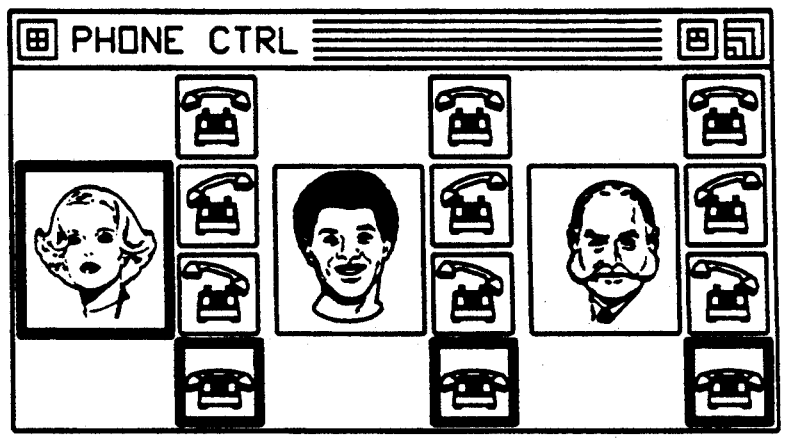
Figure 21:

To change the capability, a conferee first select the application icon in the conference room. An access control window will appear. The access control window shows all the conferee icons and all possible access capability levels are shown on the right side of the conferee icon. The current access capability level (not the ceiling capability) is highlighted. FIG. 20 and FIG. 21 show the access control windows of phone and ksh respectively. By selecting the access capability level provided in the access control window, a conferee can change the current access capability. The permission to change capabilities is always checked by the UI according to the policy mentioned above. If the change is not permitted, the current capability will not be changed. Conferees can always select any application icon to review the capabilities of that application. For the phone application, the current capability is also reflected in the phone icon in the conference room.

Figure 22:
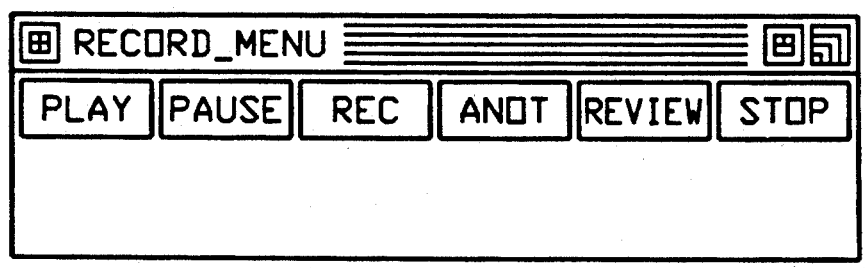

The record button provides real time conference recording, multimedia document review and annotation. When the record button is selected, a play-record menu window will be displayed (FIG. 22). The play-record menu window has five options: play, record, review, anot, and stop. To record a conference, it is assumed that the conference room has a phone application and a ksh application. When a conferee selects the record option, a query window will appear to input the file name to be recorded to and the ksh application to be recorded from. To start the recording process, the conferee needs to give the file path name (or use the default file name) and selects the ksh application icon from a conference room. The voice packets from the phone and the data packets from the ksh application are multiplexed together and stored into the given file. The temporal relationship is maintained when this multimedia file is played back.

The stop button is used to stop a conference recording. When stop is selected, the play-record menu window will disappear. To play back a recorded file, the record button is used to display a play-record window and then the play option is selected. Similar to the recording, a query window is popped up to input the file name and the ksh to play the multimedia file. When playing a file, text data will appear on the ksh application window and voice packets will be sent to the voice handset. The play option is used to play a recorded file into a conference room, so it assumes that the room has a voice application and a ksh application. A review option is provided to let a conferee review a document locally. When review is selected, a query window will be displayed for a conferee to input the file name and a ksh window will be created to review the given file. This ksh application does not belong to any conference room. During the review process, voice annotation can be invoked by selecting the anot option. Selecting the anot button will start the annotation. Voice packets will be inserted into the multimedia file. Selecting the anot again will stop the annotation. Voice annotation can also be made while playing a recorded file.

One major design consideration of the user interface concerns performance of real time conference operations. In addition to adding/deleting applications to/from a conference, the conference operations provided are: merging two conferences into one conference, and splitting one conference into two conferences. The notion of a conference room is used to represent a conference. Each conferee and each application involved in a conference are represented in the conference room by a icon. For desktop conferences, the conference room representation is a convenient way to perform real time conference operations.

When a conferee want to split a conference, he/she first selects the split button and then selects the conference room to be split by selecting the room identifier window. UI will display a splitting menu window and a new conference room. FIG. 23a illustrates a splitting menu, FIG. 23b a room which is being split, and FIG. 23c a new conference room. The new conference room will have a new identifier and the originating conferee icon in it. A splitting menu window has four selections: move, copy, abort, and done.

An application or a conferee can be copied or moved into the new conference room. When a conferee is copied, it means the conferee will participate in both the original conference and the newly created conference. When an application is copied, the original application process will be kept for the original room and a new application instance will be created for the new conference room. The contents of the original application window will not be copied into the new application window. When a conferee is moved to the new room, he/she will no longer remain in the original conference. When an application is moved into the new room, the original application may be deleted from a conferee's workstation if the conferee is not in the new room. The originating conferee uses move and copy selections repeatedly to construct the new configuration of the original conference room and the new conference room. The abort menu aborts the split process. The done menu informs UI to start the splitting process. The UI will not call the network to split the virtual circuit connection unless the done menu is selected. The originating UI needs to inform each remote UI how the conference room will be split before or after splitting the virtual circuit. Voice communication is assumed to be important for conferees to coordinate both the split and the merge operations.

If the network split operation is successful, the original connection will be split into two connections. In the connection for the original room, the channels used by the applications which have been moved are closed. In the connection for the new room, new channels are created if new application instances are created. FIGS. 24 and FIG. 24b show the room configurations after the phone is copied, and the ksh application and a conferee are moved from the original room.

Merging is an inverse process of splitting. To merge two conferences, the originating conferee first selects the merge button and then selects the two rooms to be merged in order: the merge-from room and the merge-to room. When two conference rooms are merged, all conferees in these two rooms will be merged into the merge-to room. Except for the phone, all applications from the merge-from room will be added to the merge-to room. If both rooms have phones, then only the phone in the merge-to room is kept. If a station only has the merge-from room, the merge-from room will be modified into the merge-to room. This means that applications already running will be kept (except possibly phone application) and applications from the merge-to room will be added. If a station only has a merge-to room, the UI will perform a similar task. If a station has two rooms, all the applications will be kept (except only one phone channel is kept).

Merge and Split Protocol

In one alternative implementation of a merge and split protocol, a merge or split request is transmitted into the network, and the request is propagated through the network nodes, finally delivering the request at all involved workstations. However, the merge and split operations cause alterations in the connectivity of the original MMVC(s) and the data structures associated with the MMVC(s). If a merge/split operation is committed to using a single phase protocol, as described above, then it is impossible to ensure that failure of the operation will not disrupt the original MMVC. For example, envision a merge request sent into the network. One node in the network accepts the request, updates it data structures and forwards the request on the next node. Unfortunately, the second node does not have the resources to complete the merge and thus denies the request. In this case the original MMVCs can not be recovered, since the first node has already committed to the operation; there is no alternative but to clear the MMVC. This is disastrous for the user, not only is his request denied but his previously stable connection is destroyed.

For this reason, the preferred embodiment is a two phase protocol. The protocol minimizes the effect of a failed operation on the user. The first phase of the protocol is used to determine if all components, that is work-stations and network nodes, agree to complete the merge or split operation. When the workstation originating the operation determines that all components have agreed to the operation, it initiates the second phase of the protocol by issuing an accept message. The accept message indicates that all components should complete the merge or split operation. If any component denies the requested operation during the initial phase, then the original MMVC(s) are unaffected.

The preferred protocol is shown in FIG. 25. The "mrg/splt_inquiry" is a session layer to session layer communication. The "ioctl (mrg/split)", represents an ioctl call made by the session layer requesting a merge or split be initiated by the transport layer.

Once the transport layer receives a merge or split command via an ioctl call, it sends a merge or split request (denoted wnMrg/wnSplt in FIG. 25) into the network; the latter acknowledges the receipt of the packet. When a wnMrg or wnSplit packet is received at an endstation, it is immediately acknowledged by the transport layer with a wnAck packet. This only indicates that the packet was received at the endstation. The receipt of a wnMrg or wnSplit also causes a session layer listen process to be given a merge or split request message. The listen process in turn issues a merge or split ioctl call on the far end workstation. The transport layer of each far end workstation then sends an end-to-end acknowledgement to the originating workstation, indicating that they agree to the merge/split request.

Once the originating workstation has received an end to end acknowledgement from all participating workstations, a wnMaccept or wnSaccept packet is issued. The accept packet indicates that all endstations have acknowledged receipt of the merge or split request and each station agreed to the merge or split command. This packet acts as a commit; after being sent the merge or split command can not be aborted. Upon receiving this packet the far end workstations send an end-to-end acknowledgement and then return from the ioctl call. The second set of end-to-end acknowledgements are used to indicate when the originating workstation can return from the ioctl call. Once these acknowledgements are received all connections are established and packet transfer can begin immediately.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method for use in an arrangement comprising a communication network interconnecting a plurality of user stations, said method comprising
providing a first call among a first set of said user stations,
providing a second call among a second set of said user stations and
merging said first and second calls into a single call, comprising plurality of channels comprising virtual channels of a multicast connection, among at least three user stations from said first and second sets of said user stations, said plurality of channels corresponding to a combination of channels of said first and second calls.

2. A method in accordance with claim 1 wherein said merging comprises
merging said first and second calls into a single call connection, comprising said plurality of channels, among the union of said first and second sets of user stations.

3. A method in accordance with claim 1 wherein said first call comprises a signaling channel, said second call comprises a signaling channel, at least one of said first and second calls further comprises at least one non-signaling channel, and said plurality of channels comprises a signaling channel and at least one non-signaling channel.

4. A method in accordance with claim 1 wherein said first call comprises
at least one data channel, said second call comprises at least one data channel, and said plurality of channels includes a data channel for each data channel of said first and second calls.

5. A method in accordance with claim 4 wherein at least one of said first and second calls further comprises a voice channel, and said plurality of channels further includes a voice channel.

6. A method in accordance with claim 5 wherein said first call further comprises a signaling channel, said second call further comprises a signaling channel, and said plurality of channels further includes a signaling channel.

7. A method in accordance with claim 4 wherein at least one of said first and second calls further comprises an image channel, and said plurality of channels further includes an image channel.

8. A method in accordance with claim 4 wherein at least one of said first and second calls further comprises a video channel, and said plurality of channels further includes a video channel.

9. A method in accordance with claim 1 further comprising
in response to user input, selectively providing said at least three user stations with access to transmit information to and receive information from said plurality of channels.

10. A method in accordance with claim 1 wherein at least one of said first set of user stations and at least one of said second set of user stations include display means, said method further comprising in response to user input at said one of said first set stations, both establishing said first call in said network and displaying representations corresponding to said first set of user stations in a window on said display means of said one of said first set stations, and in response to user input at said one of said second set stations, both establishing said second call in said network and displaying representations corresponding to said second set of user stations in a window on said display means of said one of said second set stations.

11. A method in accordance with claim 1 wherein one of said plurality of user stations is a member of both of said first and second sets, said one user station comprises display means, said merging is in response to user input at said one user station, said method further comprising further in response to said user input at said one user station, displaying representations corresponding to user stations of said first and second sets in a window on said display means.

12. A method in accordance with claim 11 further comprising further in response to said user input at said one user station, displaying, in said window, representations each corresponding to one of said plurality of channels.

13. A method in accordance with claim 11 wherein said plurality of channels includes at least one data channel, said method further comprising displaying, in a second window of said display means, a data communication application shared among user stations of said first and second sets via said one data channel.

14. A method in accordance with claim 1 wherein one of said plurality of user stations is a member of both of said first and second sets, said method further comprising in response to user input at said one user station, transmitting a merge request via said network to each of the other user stations of said first and second sets, and in response to receipt of a favorable reply to said merge request from each of said other user stations of said first and second sets, said one user station initiating said merging.

15. A method for use in an arrangement comprising a communication network interconnecting a plurality of user stations, said method comprising establishing a first call, comprising at least a voice channel and a data channel, among one user and a first set of a multiplicity of said user stations, establishing a separate, second call, comprising at least a voice channel, among said one said user and a second set of a different multiplicity of said user stations, and in response to a request at said one user station, merging said first and second calls into a single call, comprising at least a voice channel and a data channel, among user stations of said first and second sets.

16. A method for use in an arrangement comprising a communication network interconnecting a plurality of user stations, said method comprising providing a single call, comprising a plurality of channels, among a set of said user stations, and splitting said single call into a first call among a first subset of said set of user stations and a second call among a second subset of said set of user stations, said first call including channels corresponding to a first subset of said plurality of channels and said second call including channels corresponding to a second subset of said plurality of channels.

17. A method in accordance with claim 16 wherein said plurality of channels includes a signaling channel and at least one non-signaling channel, said first call comprises a signaling channel, said second call comprises a signaling channel, and at least one of said first and second calls further comprises at least one non-signaling channel.

18. A method in accordance with claim 16 wherein one of said set of user stations is a member of both of said first and second subsets of user stations, said method comprising in response to user input at said one station, transmitting a split request via said network to each of the other user stations of said set of user stations, and in response to receipt of a favorable reply to said split request from each of said other user stations of said set of user stations, said one station initiating said splitting.

19. A method for use in an arrangement comprising a communication network interconnecting a plurality of user stations, said method comprising said network providing a first call among a first set of at least three of said user stations, said first call comprising at least a voice channel, said network providing a separate, second call among a second set of at least three of said user stations, said second call comprising at least a voice channel, where only one of said plurality of user stations is a member of both of said first and second sets, and said one user station enabling a selected other of said user stations to communicate via both of said first and second calls at the same time.

20. A method in accordance with claim 19 wherein said enabling comprises enabling said selected other user station to transmit voice concurrently on said voice channels of both of said first and second calls.

21. A method in accordance with claim 19 wherein said enabling comprises enabling said selected other user station to transmit voice on the voice channel of one of said first and second calls and to concurrently receive voice on the voice channel of the other of said first and second calls.

22. A method in accordance with claim 19 wherein said enabling comprises enabling said selected other user station to receive voice concurrently on said voice channels of both of said first and second calls.

23. A method in accordance with claim 19 wherein said one user station comprises display means, said method further comprising displaying, for said first call, representations corresponding to said first set of user stations in predefined association on said display means, and concurrently displaying, for said second call, representations corresponding to said second set of user stations in predefined association on said display means.

24. A method in accordance with claim 19 wherein said one user station comprises display means, said method further comprising displaying, for said first call, representations corresponding to said first set of user stations in a first window on said display means, and displaying, for said second call, representations corresponding to said second set of user stations in a second window on said display means.

25. A method in accordance with claim 19 wherein said one user station comprises display means, said first call further comprising at least one data channel, said method further comprising displaying, for said first call, representations corresponding to said first set of user stations and a representation corresponding to said data channel in predefined association on said display means.

26. A method in accordance with claim 19 further comprising said network merging said first and second calls into a single call, comprising at least a voice channel, among said first and second sets of user stations.

27. A method in accordance with claim 19 further comprising said network splitting a single call into said first and second calls, said single call comprising at least a voice channel among said first and second sets of user stations.

28. A method for use in an arrangement comprising a communication network interconnecting a plurality of user stations, said method comprising said network providing a first call among a first set of said user stations, said network providing a second call among a second set of said user stations, where one of said plurality of user stations is a member of both of said first and second sets and said one user station comprises display means, and displaying, for said first call, representations corresponding to said first set of user stations in a first window on said display means, and concurrently displaying, for said second call, representations corresponding to said second set of user stations in a second window on said display means.

29. A method in accordance with claim 28 further comprising in response to user input at said one station, both excluding one of said first set of user stations from said first call and removing the representation corresponding to said excluded user station from said first window.

30. A method in accordance with claim 28 where said first call comprises a plurality of channels, said method further comprising displaying, in said first window, representations each corresponding to one of said plurality of channels.

31. A method in accordance with claim 30 wherein said plurality of channels includes at least one data channel, said method further comprising displaying, in a third window of said display means, a data communication application shared among said first set of user stations via said one data channel.

32. A method in accordance with claim 31 further comprising in response to user input at said one station, both excluding said data communication application from said first call and removing the representation corresponding to said one data channel from said first window.

33. A method in accordance with claim 28 wherein said first call includes at least one non-signaling channel, said method further comprising in response to user input at one of said first set of user stations, selectively providing said first set of user stations with access to transmit information to and receive information from said non-signaling channel.

34. A method in accordance with claim 28 further comprising recording said first call while communicating on said second call.

* * * * *